(12) United States Patent
Wilkinson et al.

(10) Patent No.: US 7,596,808 B1
(45) Date of Patent: Sep. 29, 2009

(54) ZERO HOP ALGORITHM FOR NETWORK THREAT IDENTIFICATION AND MITIGATION

(75) Inventors: Mark L. Wilkinson, Austin, TX (US); Gregory S. Althaus, Austin, TX (US)

(73) Assignee: TW Acquisition, Inc., Chicago, IL (US)

( * ) Notice: Subject to any disclaimer, the term of this patent is extended or adjusted under 35 U.S.C. 154(b) by 1018 days.

(21) Appl. No.: 10/836,871

(22) Filed: Apr. 30, 2004

(51) Int. Cl.
*G06F 11/00* (2006.01)

(52) U.S. Cl. .............................. 726/22; 726/23; 726/24; 726/25; 726/3; 709/223; 709/224; 710/100

(58) Field of Classification Search ............. 726/22–25, 726/3; 235/375; 710/100; 709/223–224; 713/150; 370/390, 432
See application file for complete search history.

(56) References Cited

U.S. PATENT DOCUMENTS

| 5,920,699 A | * | 7/1999 | Bare .......................... 709/225 |
| 2004/0103275 A1 | * | 5/2004 | Ji et al. ....................... 713/150 |
| 2006/0124720 A1 | * | 6/2006 | Burbridge et al. ........... 235/375 |

* cited by examiner

*Primary Examiner*—Thanhnga B Truong

(57) ABSTRACT

A method, system, apparatus, and computer-readable medium to enable a set of security device interfaces within a broadcast domain to identify and mitigate attacks. For each address of a device communicating within the broadcast domain, a responsible interface is determined by a zero hop ownership determination algorithm. The algorithm operates by counting a respective number of replies observed by each of multiple interfaces. Each reply is made in response to a respective request for one address. A responsible interface is assigned to the one address using the respective number of replies observed by each respective interface. The algorithm approximates the security device interface physically closest to the address in question without querying the switches themselves and without requiring the security device interface to be in-line on the network.

44 Claims, 16 Drawing Sheets

Virtual LANs

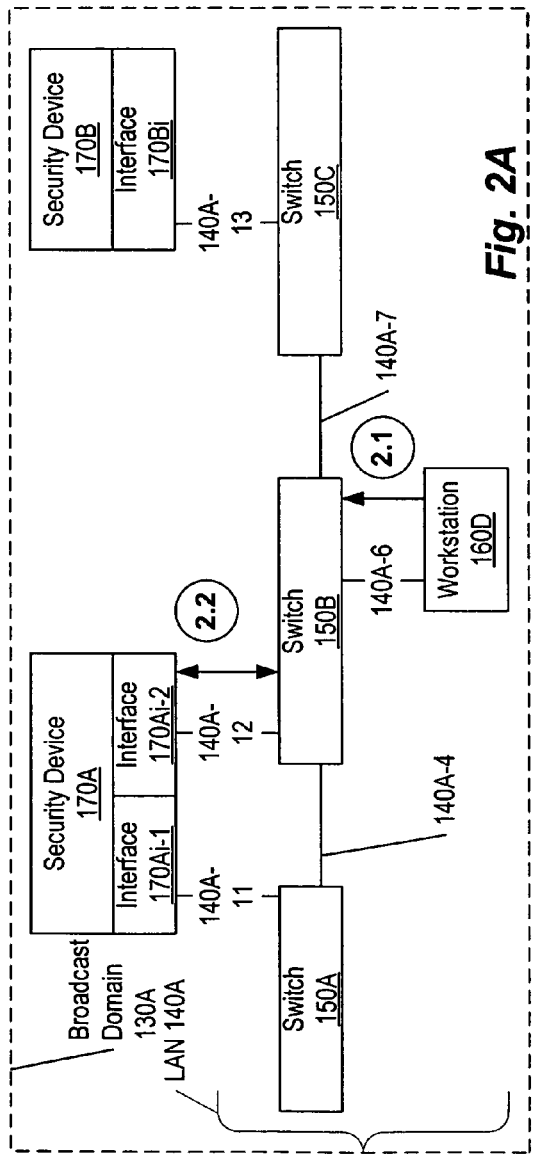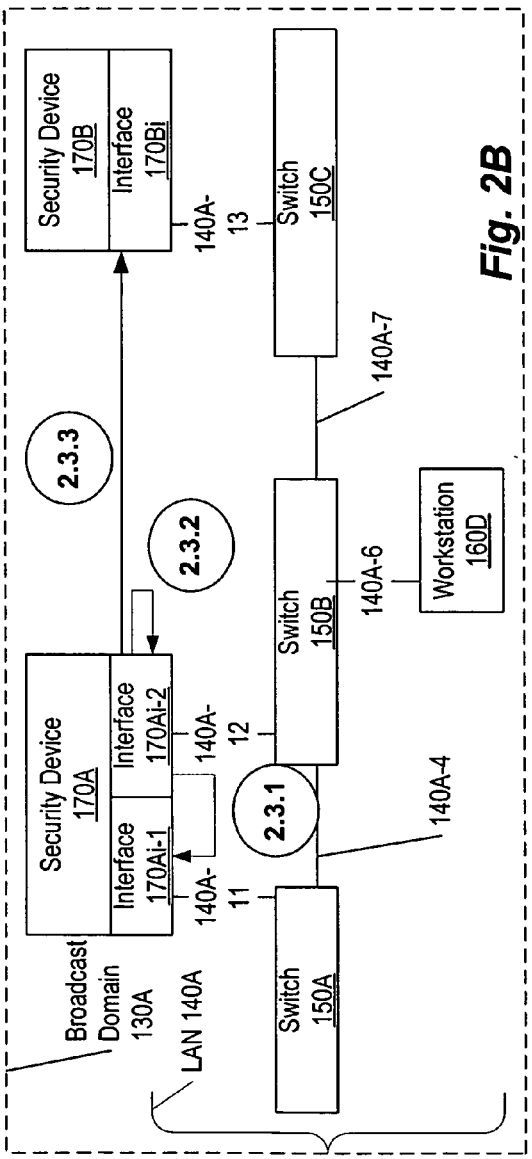

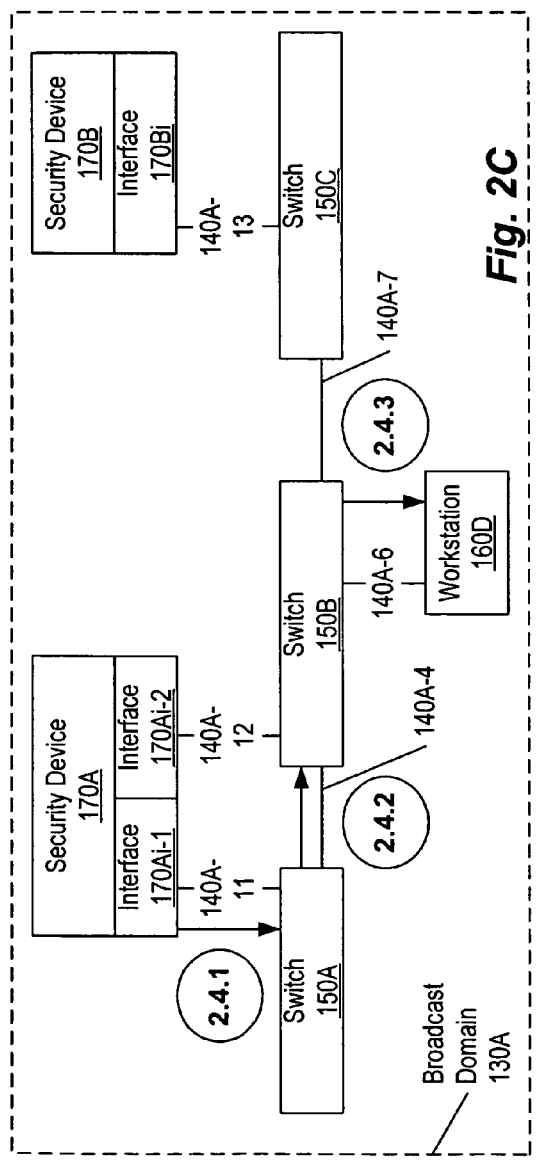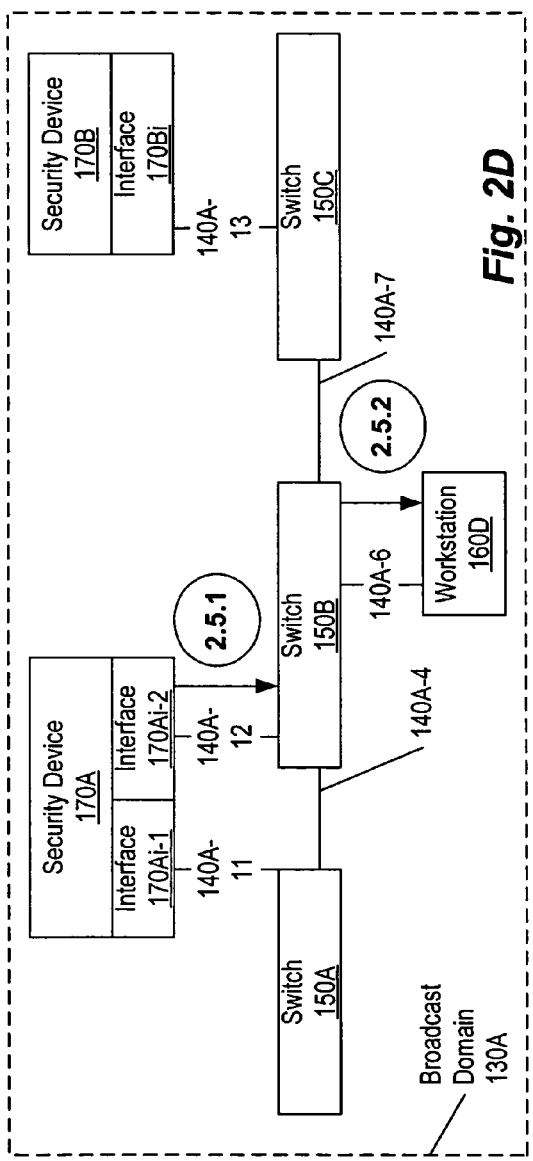

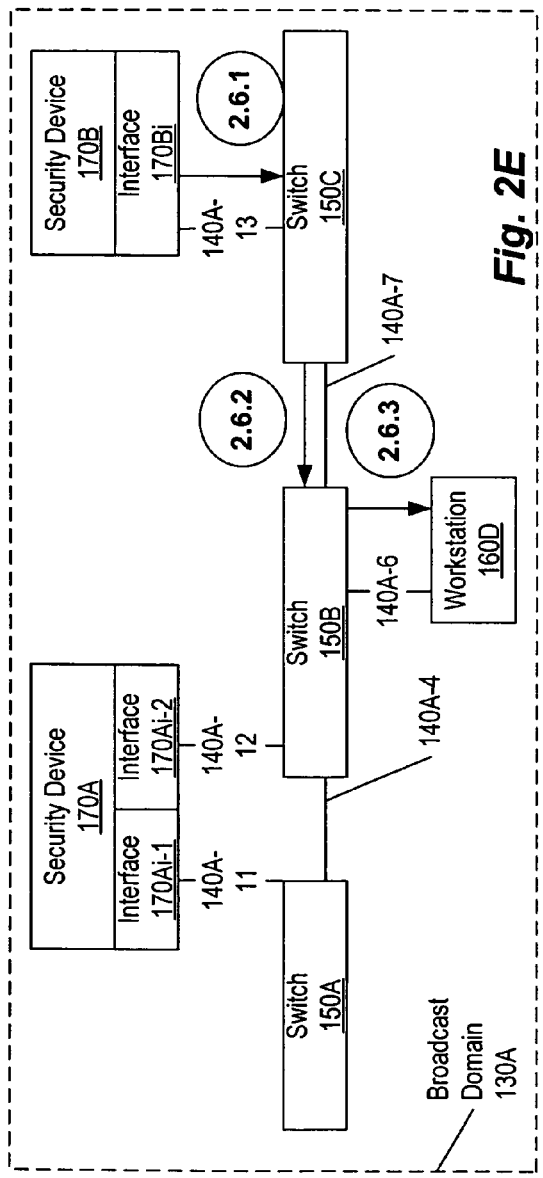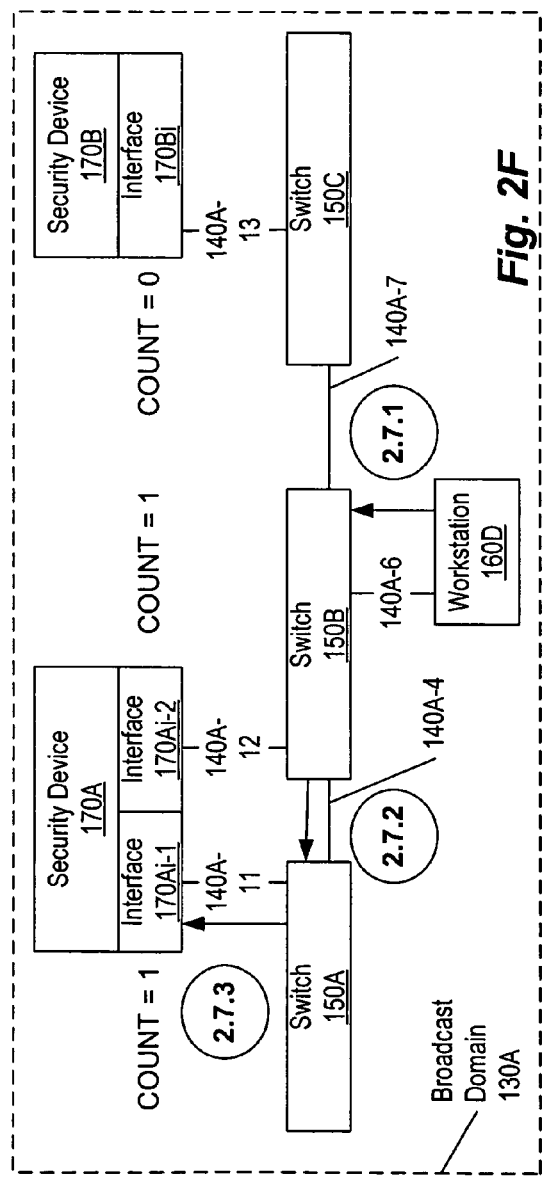

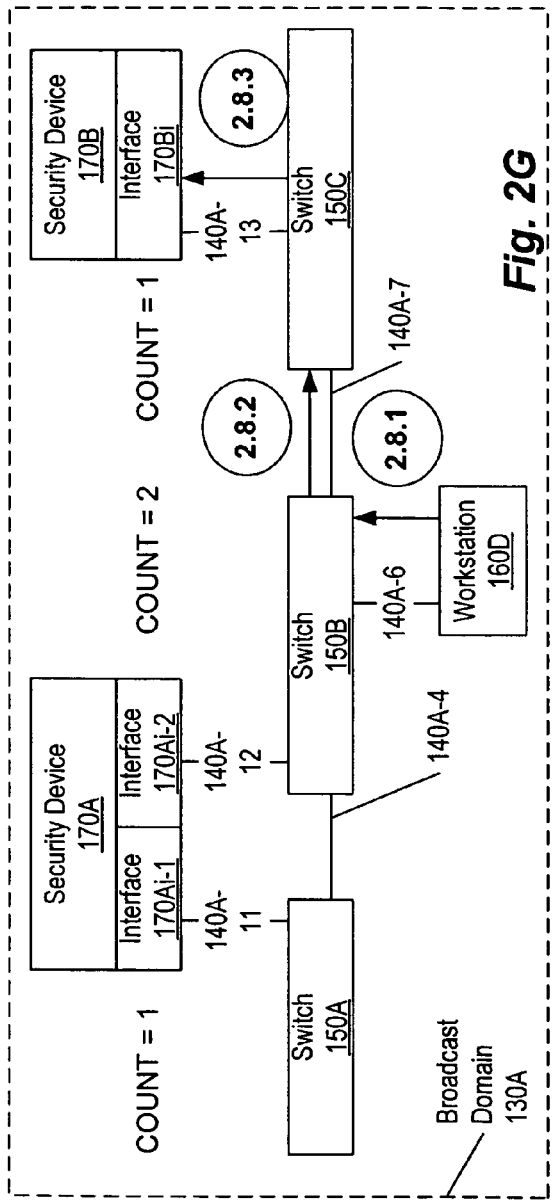
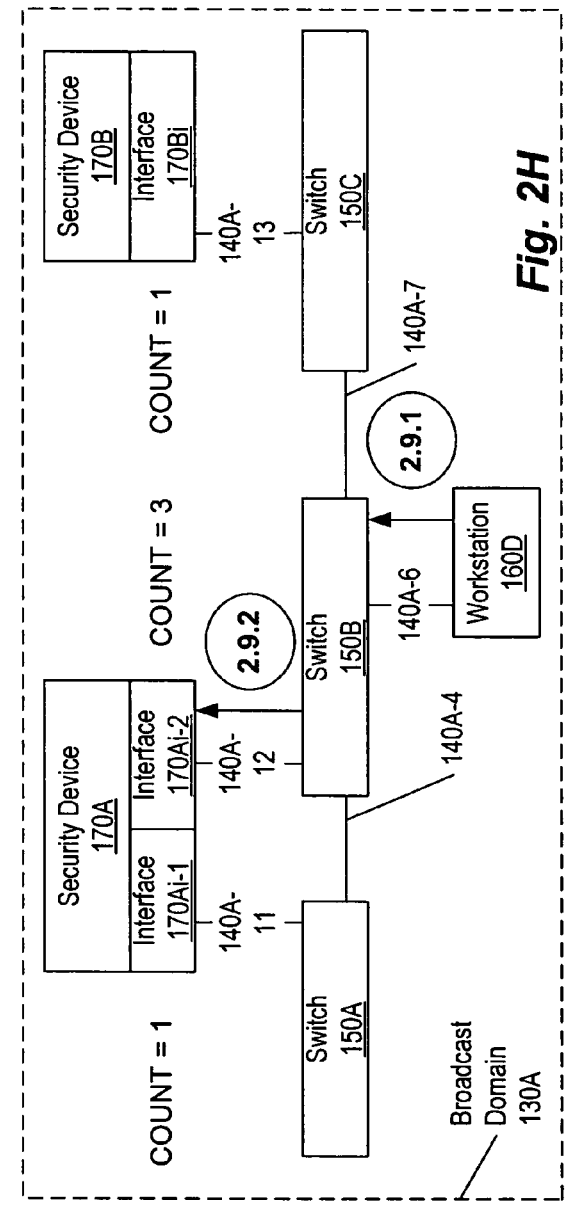

Zero Hop Determination Algorithm

Process Data Packet

Process Service Request

Process Message

Process Message (continued)

Overall Zero Hop Timer

Address Query Reply Timer

"I Own" Timer

ZERO HOP ALGORITHM FOR NETWORK THREAT IDENTIFICATION AND MITIGATION

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

FIELD OF INVENTION

This invention, in general, relates to a system and method for tracking and mitigating threats to a network. The system and method minimize overhead in tracking and mitigating threats by assigning a responsible interface to monitor communication with each physical address communicating within a broadcast domain of the network.

BACKGROUND OF THE INVENTION

Global networking of computers has greatly affected business. As the number of computers linked to networks grows, businesses increasingly rely on networks to interact. More and more people use electronic mail, websites, various file transfer methods, and remote office applications, among other types of software, to facilitate business transactions and perform job related tasks.

These applications and uses still rely on early network addressing technologies and flow control protocols to transmit data packets across networks. For example, the Internet Protocol (IP) is an addressing protocol for referencing remote devices on a network. The protocol is implemented to include a packet header that contains bits representing an address of the source, an address of the target, and various other parameters associated with the packet. The Address Resolution Protocol (ARP) is used to reconcile physical addresses on local segments of a network with IP addresses. Other protocols are used for flow control including Transmission Control Protocol (TCP) and User Datagram Protocol (UDP). These protocols may be used to control the flow of packets across a network (e.g., between different network segments) including subdividing and reassembling the packets. TCP also includes methods for verifying the arrival of a packet. Other protocols include Internet Control Message Protocol (ICMP), Internetwork Packet Exchange (IPX), NetBios, and ARP, among others. Historically, these protocols were designed for use on a trusted network and as such do not include many security features. To address this problem, newer protocols are designed to include some security measures. However, at present, the global Internet and many local area networks predominantly use older protocols with various vulnerabilities.

Hackers and malfeasants take advantage of the weaknesses in these protocols to disrupt, infiltrate, or destroy networked devices. These attacks include worms, viruses, denial-of-service, and infiltration attacks, among others. Worms are self-replicating programs that infect computers. In some cases, these worms take advantage of the trusting relationships between computers to infiltrate a network and send network data to the attacker. Viruses infect files and utilize vulnerabilities of programs that interpret the files to propagate. A virus may also function to erase data. Denial-of-services attacks often limit the network activity of a target computer by inundating the target with requests or messages. In one example, an attacking computer or set of computers may send a plethora of low level pings to the target device. If the pings include a non-existent return address, the target machine could send a response message and pause over a timeout period for a response. In attempting to respond to the pings, the machine effectively denies network access to other applications.

Infiltrating attacks often circumvent password security and gain access to files. Once the attacker has accessed the network, the attacker may steal private information such as credit card or social security numbers. Moreover, the attacker may damage valuable data, install a worm or spying program, or install programs to utilize computational capacity.

Hackers use various tools and methodologies to discover vulnerable devices and interact with them. These tools include address scanners, port scanners, worms, and packet formulation programs, among others. For example, a hacker may send reconnaissance packets to a local network segment in search of a computer or device. Once a device is found, the hacker may scan the ports on the device in search of a vulnerable port.

Several approaches exist for protection against hackers. Typically, these protections are defensive shield-like methods. The most common are firewalls, intrusion detection systems (IDS), and anti-virus software. Firewalls are devices typically placed as shields between a local network and the global network. Firewalls are the most common form of network protection. They perform their function by limiting communication between the local network and global network in accordance with various filters and rules. Typically, network traffic is either blocked or permitted based on rules regarding protocols, addressing, and port number. These filters are infrequently changed and can unintentionally encumber certain permissible network traffic while permitting unwanted traffic. Furthermore, firewalls stop traffic from entering the network but do not operate within the interior of the network to prevent unwanted traffic from being disseminated.

Intrusion detection systems detect intrusions or attacks and report these attacks to network security. The systems predominantly use packet signatures to evaluate packets after the packets have entered the network. However, these systems have been shown to be unreliable as they can generate false positive results. Often, the systems require evaluation of the contents of a packet, a time-consuming process that can hinder network communication. Furthermore, to detect a threat, each packet passing through the network may need to be evaluated before an attack can be detected. In addition, these systems may not detect packets with signatures that are not found in their signature database, resulting in false negatives as well. Moreover, these systems often present the data to network security in a format that prevents timely response to threats.

Similarly, anti-virus software typically relies on file signatures to detect viruses. As such, frequent updates are required to maintain a current database of virus signatures. If an undocumented virus enters the network, the anti-virus software will likely fail. Furthermore, most anti-virus software resides on each host machine within the network. If the anti-virus software can be defeated by an attack on one host machine, every instance of the anti-virus software on every host machine can be defeated.

Many network security systems suffer from deficiencies in detecting and preventing attacks on a network. Many other problems and disadvantages of the prior art will become apparent to one skilled in the art of network security systems after comparing such prior art with the present invention as described herein.

SUMMARY OF THE INVENTION

Features of the invention may be found in a system, method, computer-readable medium, and apparatus that minimize overhead in tracking and mitigating threats in a network. One responsible interface is assigned to monitor communication with each physical address communicating within a broadcast domain of the network. The responsible interface works independently of switching devices and routing protocols within the broadcast domain by operating at the data link layer (layer 2 of the OSI reference model for open interconnection of computer systems). The responsible interface can be implemented in a heterogeneous networking environment having devices provided by different vendors and communicating using different network architectures. The responsible interface passively observes communication with each physical address in the network, thereby detecting an attack upon entry to the network and preventing an attack from spreading to other parts of the network.

A system, method, apparatus, and computer-readable medium for tracking and mitigating threats are described. Other aspects, advantages and novel features of the present invention will become apparent from the detailed description of the invention when considered in conjunction with the accompanying drawings.

BRIEF DESCRIPTION OF THE DRAWINGS

For a more complete understanding of the present invention and advantages thereof, reference is now made to the following description taken in conjunction with the accompanying drawings in which like reference numbers indicate like features.

FIGS. 2A through 2H, collectively referred to as FIG. 2, show data flows in assigning a responsible interface to an address within the environment of FIG. 1.

FIG. 2A shows an initial communication from a workstation in a broadcast domain and detection of the communication by a security device interface.

FIG. 2B shows initiation of the zero hop ownership determination algorithm for determining an owner for the workstation of FIG. 2A.

FIG. 2C shows an address query sent by one of the security device interfaces of FIG. 2B to the workstation of FIG. 2A in response to the initiation of the zero hop ownership determination algorithm in FIG. 2B.

FIG. 2D shows an address query sent by another one of the security device interfaces of FIG. 2B to the workstation of FIG. 2A in response to the initiation of the zero hop ownership determination algorithm in FIG. 2B.

FIG. 2E shows an address query sent by another one of the security device interfaces of FIG. 2B to the workstation of FIG. 2A in response to the initiation of the zero hop ownership determination algorithm in FIG. 2B.

FIG. 2F shows a reply sent by the workstation in response to the address query of FIG. 2C and the associated reply counts by the security device interfaces.

FIG. 2G shows a reply sent by the workstation in response to the address query of FIG. 2E and the associated reply counts by the security device interfaces.

FIG. 2H shows a reply sent by the workstation in response to the address query of FIG. 2D and the associated reply counts by the security device interfaces.

DETAILED DESCRIPTION

Figure 1A:
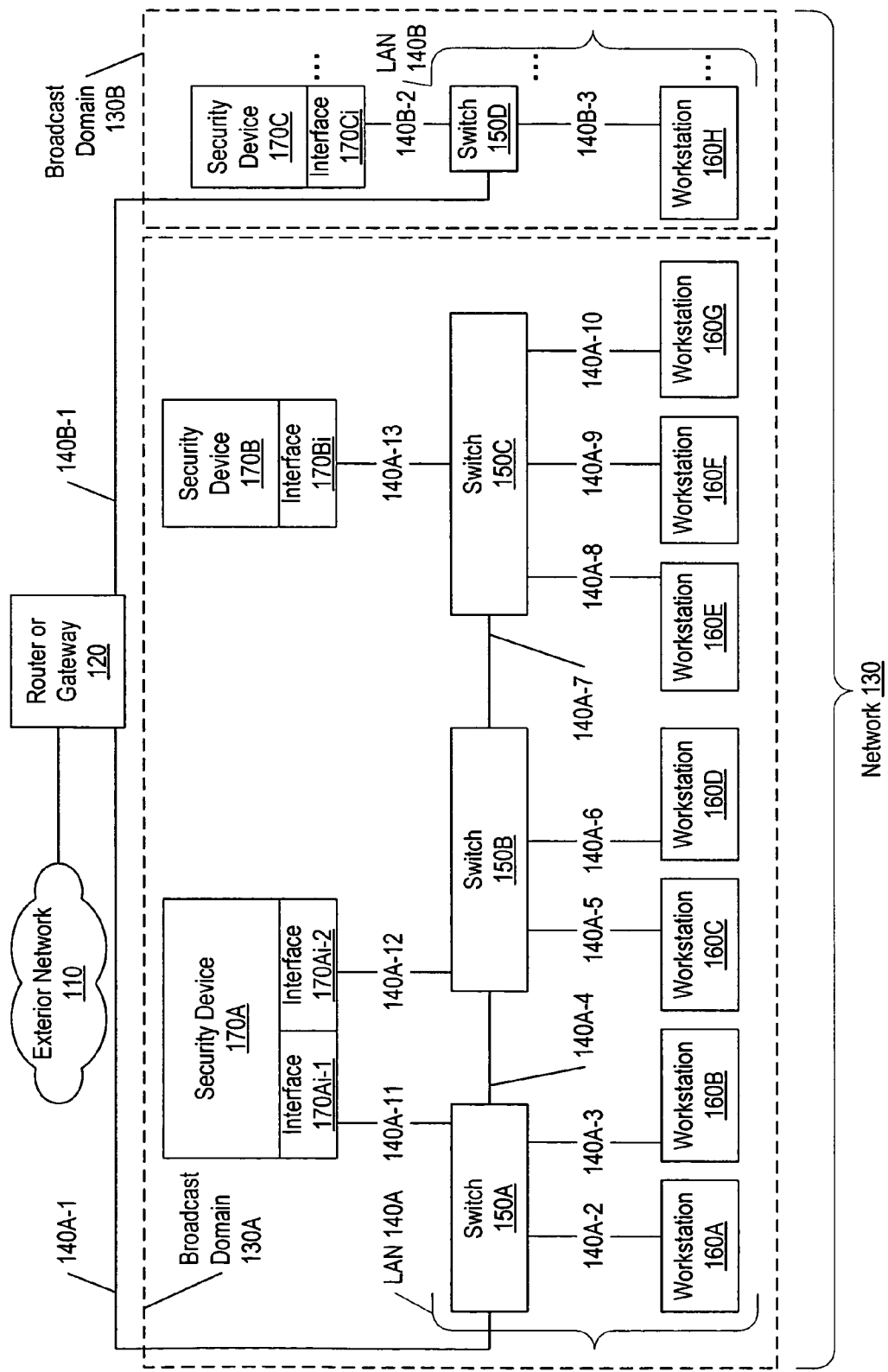
FIG. 1A is a schematic block diagram depicting a networking environment in which the present invention may operate.

In attempting to contact and infiltrate networks, attackers or programs implemented by the attackers act with characteristic behaviors to determine the address of computers on local segments and communicate with them. These behaviors may be used, separately, or in combination with packet signatures and filters, to identify the attackers as threats. Once identified, communication between the network and the attacker may be controlled, preventing further damage. One method is to deceive the attacker, preventing them from either perceiving the existence of a machine or redirecting their communication to an alternative device such as a security device or sacrificial computer.

In one embodiment, a set of security device interfaces are used within a broadcast domain to identify and mitigate attacks. For each address of a device communicating within the broadcast domain, a responsible interface is determined by a zero hop ownership determination algorithm. The zero hop ownership determination algorithm is designed to identify the security device interface physically closest to the address in question, which should require no hops on the network to physically connect with the device.

The zero hop ownership determination algorithm operates without querying the switches themselves. One premise for identifying the interface closest to the address is that a security device interface closest to an address that is either the source or target of an attack has the best opportunity to mitigate the attack and prevent spreading packets associated with the attack to other parts of the network. Without querying the switches, the zero hop ownership determination algorithm observes communication through the switches. In one embodiment, the security device interface is implemented as a spanned or mirrored port on a switch, although the security device interface can be implemented as an ordinary read/ write port or as a port in trunked mode in a virtual LAN environment. Other embodiments of the invention are also possible.

The communication observed is a set of messages and service requests performed in accordance with a proposed layer 2 protocol for counting replies to an address query. The interface observing the largest number of replies is assigned as the responsible interface as an approximation for the interface physically closest to the device.

Unlike signature-based intrusion detection interfaces, in some embodiments, the responsible security device interface does not need to evaluate every packet flowing through the network to identify a potential threat. The security device interface is not involved in switching or routing of packets and operates in promiscuous mode (observing all packets rather than only packets addressed to the security device interface). As a result, the security device interface does not impose a point of vulnerability and has no effect on network traffic if the security device fails. Furthermore, the zero hop ownership determination algorithm does not rely on a database of signatures of known viruses, and thus is more likely to identify and stop an attack having a signature not currently identified in signature databases.

An environment in which the security device interface operates is described with reference to FIGS. 1A and 1B, followed by an example of data flows through the security device interface during the zero hop ownership determination algorithm in FIGS. 2A through 2H. More detailed flowcharts of one embodiment of a method for implementing the security device interface are given in FIGS. 3 through 11.

FIG. 1A is a schematic block diagram depicting a networking environment in which the present invention may operate. An exterior network 110 is connected via a router/gateway 120 to a network 130 made up of broadcast domains 130A and 130B. Router/gateway 120 routes traffic from exterior network 110 to various devices on a local area network or a local segment of network 130. In the embodiment shown in FIG. 1A, each of broadcast domains 130A and 130B includes a local area network (LAN) 140A or 140B, respectively. Router/gateway 120 is connected to LAN 140A in broadcast domain 130A via connection 140A-1 and to LAN 140B in broadcast domain 130B via connection 140B-1. Additional detail is shown for broadcast domain 130A, although one of skill in the art will understand that broadcast domain 130B can have multiple security devices, switches, and workstations, just as broadcast domain 130A does. Furthermore, router/gateway 120 can connect a number of instances of broadcast domains.

Within broadcast domain 130A, switch 150A connects workstations 160A and 160B to LAN 140A via connections 140A-2 and 140A-3. Switch 150B connects workstations 160C and 160D to LAN 140A via connections 140A-5 and 140A-6. Switch 150C connects workstations 160E, 160F, and 160G to LAN 140A via connections 140A-8, 140A-9, and 140A-10, respectively. Switch 150A is connected to switch 150B via connection 140A-4, and switch 140B is connected to switch 150C via connection 140A-7. In broadcast domain 130B, switch 150D connects workstation 160H to LAN 140B via connection 140B-3.

A firewall (not shown) may be placed between exterior network 110 and network 130. Within network 130, security devices 170A, 170B, and 170C are used to detect and mitigate an infiltration by an attacker. Security device 170A has two interfaces, interface 170Ai-1 and 170Ai-2. Security device interface 170Ai-1 is connected to switch 150A via connection 140A-11, and security device interface 170Ai-2 is connected to switch 150B via connection 140A-12. Security device 170B has one interface to switch 150C, interface 170Bi, via connection 140A-13. In broadcast domain 130B, security device 170C has one interface to LAN 140B, interface 170Ci. While a security device may have one or more interfaces in accordance with the present invention, each of the interfaces can be considered to be capable of performing the functionality of the methods described herein. Security devices 170A and 170B detect attacks on LAN 140A, and security device 170C detects attacks on LAN 140B. Security devices 170A, 170B, and 170C may mask other devices attached to the respective LANs 140A and 140B from an attacker. The attacker may be connected to the exterior network 110 or inside network 130.

Exterior network 110 may take various forms and may communicate with various protocols such as IP, TCP, UDP, ICMP, HTTP, and FTP, among others. Local area networks 140A and 140B may take various forms including Ethernet, Wireless Ethernet, Token ring, Apple Talk, or various combinations of these. In one exemplary embodiment, one or both of LANs 140A and 140B may be an Ethernet network that resolves logical and physical network addresses using an address resolution protocol (ARP). ARP resolves the addresses between Internet Protocol (IP) addresses and physical address such as media access control (MAC) addresses within a broadcast domain.

Security devices 170A, 170B, and 170C, or some other computational device such as a server, workstation, router, switch, or gateway, may function to detect attacks on each of LANs 140A and 140B. Such security devices are described in further detail in the following co-pending U.S. Patent Applications:

U.S. patent application Ser. No. 10/749,718, entitled "System And Method For Managing Network Communications," filed Dec. 31, 2003, and naming Mark L. Wilkinson, Ronald J. Miller, and Michael J. McDaniels as inventors.

U.S. patent application Ser. No. 10/676,709, entitled "System And Method For Detecting and Managing Network Incursion," filed Oct. 1, 2003, and naming Mark L. Wilkinson, Ronald J. Miller, and Michael J. McDaniels as inventors.

U.S. patent application Ser. No. 10/676,637, entitled "System and Method for Deterring Network Incursion," filed Oct. 1, 2003, and naming Mark L. Wilkinson, Ronald J. Miller, and Michael J. McDaniels as inventors.

U.S. patent application Ser. No. 10/676,541, entitled "Tracking Communication for Determining Device States," filed Oct. 1, 2003, and naming Mark L. Wilkinson, Ronald J. Miller, and Michael J. McDaniels as inventors.

U.S. patent application Ser. No. 10/676,505, entitled "Logical/Physical Address State Lifecycle Management," filed Oct. 1, 2003, and naming Mark L. Wilkinson, Ronald J. Miller, and Michael J. McDaniels as inventors.

Each of these U.S. Patent Applications is hereby incorporated by reference in its entirety and for all purposes. The security devices described in the above-described U.S. Patent Applications, singly or in combination, may hold and compile a list of devices, MAC addresses, or source IP addresses of devices that represent threats to the network. Using this list, the device or devices may capture packets, compare the MAC address, source IP address, or target IP address with known threats to the network and take steps to control or prevent communication with vulnerable devices.

For example, in the above-referenced U.S. Patent Applications, the security device may create ARP packets with synthetic hardware addresses associated with the IP addresses of either local devices or attacking devices. In this manner, the ARP tables may be altered, causing packets to be sent across the network to physical addresses other than those targeted by the communication. For example, the synthetic hardware addresses may be MAC addresses that are not in use by devices on LAN 140A. Alternately, the synthetic hardware address may be the address of a sacrificial computer, defense system, or security system, among others.

Figure 1B:
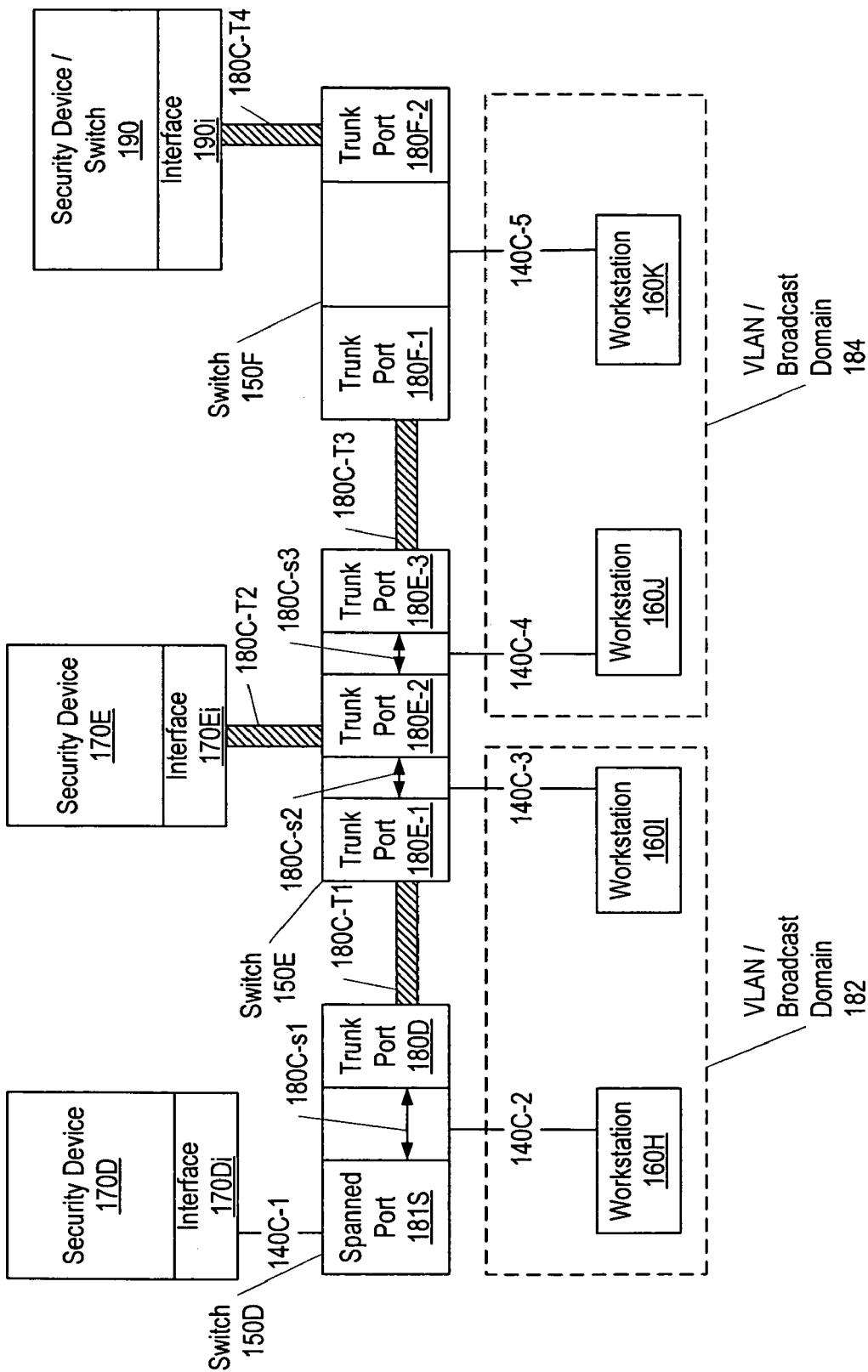
FIG. 1B is a schematic block diagram depicting a virtual networking environment in which the present invention may operate.

FIG. 1B is a schematic block diagram depicting a virtual networking environment in which the present invention may operate. A virtual LAN can be logically partitioned without the need to run new cables or to make major changes in network infrastructure. Ports or hosts can be assigned to different VLANs without regard to physical location. In this example, two VLANs are shown: VLAN/broadcast domain 182, which includes workstations 160H (physically connected to switch 150D) and workstation 160I (physically connected to switch 150E). VLAN/broadcast domain 184 includes workstations 160J (physically connected to switch 150E) and workstation 160K (physically connected to switch 150F). Workstations 160H, 160I, 160J, and 160K are connected to respective switches 150D, 150E, and 150F via respective connections 140C-2, 140C-3, 140C-4 and 140C-5, which are not trunk connections.

Selected ports of switches 150D, 150E, and 150F are shown to illustrate various embodiments of security devices in a virtual networking environment. One of skill in the art will understand that other ports exist on switches 150D, 150E, and 150F, such as a port into which connection 140C-2 connects, but are not shown for clarity of illustration. A trunk between switches 150D, 150E, and 150F is made up of trunk connections 180C-T1, 180C-T2, 180C-T3, and 180C-T4. Switches 150D and 150E are connected via trunk connection 180C-T1 between trunk port 180D of switch 150D and trunk port 180E-1 of switch 150E. Switch 150E is connected to switch 150F by trunk connection 180C-T3 between trunk port 180-E3 of switch 150E and trunk port 180F-1 of switch 150F.

The environment shown in FIG. 1B includes three security devices, security device 170D, security device 170E, and security device/switch 190. One of skill in the art will recognize that the three security devices 170D, 170E, and 190 illustrate three different embodiments of the security device interfaces described herein and that all three types may or may not be used in the same network. The operation of security device/switch 190 as a switch is described in further detail below.

When data passes through one of the trunk ports 180D, 180E-1, 180E-2, 180E-3, 180F-1, or 180F-2, the data are encapsulated in a special frame and tagged to be sent to a particular VLAN. Each packet is forwarded to each switch connected to the trunk via one of trunk connections 180C-T1 through 180C-T4. The tag is removed before the data exits the designated port to which the packet is directed. Even though workstations 160I and 160J are physically connected to switch 150E, each packet is tagged for only one VLAN. As a result, workstation 160I can see only communication on VLAN/broadcast domain 182 and workstation 160J can see only communication on VLAN/broadcast domain 184, even though the data pass through the same physical switch 150E.

Security device interface 170Di of security device 170D is connected to spanned port 181S of switch 150D via connection 140C-1, which is not a trunk connection. However, spanned port 181S spans trunk port 180D of switch 150D, as shown by span connection 180-s1. Therefore, spanned port 181S has visibility into trunk connection 180C-T1 between switches 150D and 150E. Spanned port 181S may communicate both tagged data and data that are not tagged for a VLAN.

Security device interface 170Ei of security device 170E is connected to trunk port 180E-2 of switch 150E via trunk connection 180C-T2. Trunk port 180E-2 is configured as a spanned port and spans trunk ports 180E-1 and 180E-3, as shown by span connections 180C-s2 and 180C-s3. As a result of this spanning configuration, security device interface 170Ei has visibility to both VLANs/broadcast domains 182 and 184. Trunk port 180E-2 may communicate both tagged data and data that are not tagged for a VLAN.

Security device interface 190i of security device/switch 190 is connected to switch 150F trunk port 180F-2 via trunk connection 180C-T4. Security device/switch 190 is configured as both a security device and a switch. Therefore, traffic seen by security device/switch 190 depends upon the protocol used to communicate between switch 150F and security device/switch 190. For example, the Remote Network Monitoring (RMON) protocol could be used to configure switch 150F as an RMON probe and security device/switch 190 as an RMON receiver. As a result, each packet seen by switch 150F may be forwarded to security device/switch 190. As a result, security device interface 190i has visibility into traffic in VLAN/broadcast domain 184 via trunk connection 180C-T3.

The methods and software described herein can be used in either a physical networking environment as shown in FIG. 1A, in a virtual networking environment as shown in FIG. 1B, or in any combination of physical and virtual networks. VLAN tagging is performed at the switch level and is transparent to the devices or hosts connected to the switches. As a result, the zero hop ownership algorithm described herein operates independently of the implementation of membership in the underlying physical and virtual networks.

FIGS. 2A through 2H, collectively referred to as FIG. 2, show data flows in assigning a responsible interface to an address within the environment of FIG. 1A. A subset of the devices shown in the environment of FIG. 1A is shown for clarity of illustration. In the following figures, encircled action labels are provided to aid the reader in following the sequence of the data flows therein.

FIG. 2A shows an initial communication from a workstation in a broadcast domain and detection of the communication by a security device interface. In action 2.1, workstation 160D sends a message over LAN 140A via connection 140A-6 through switch 150B. In action 2.2, security device interface 170Ai-2 of security device 170A detects the communication via direct connection 140A-12 between interface 170Ai-2 and switch 150B. Security device 170A is not in-line in the communication between workstation 160D and LAN 140A and only observes communication through switch 150B.

In one embodiment, if a device such as workstation 160D has not previously communicated within broadcast domain 130A, a security device interface, such as security device interface 170Ai-2, adds the address for the workstation to an address list for all addresses observed communicating within the broadcast domain, here broadcast domain 130A. Security device interface 170Ai-2 then initiates a zero hop ownership determination algorithm to determine which of the security device interfaces 170Ai-1, 170Ai-2, and 170Bi-1 will own and manage communication with the newly-observed address.

FIG. 2B shows initiation of the zero hop ownership determination algorithm for determining an owner for the workstation of FIG. 2A. In response to detecting the communication by newly observed workstation 160D, security device interface 170Ai-2 sends a "zero hop" service request to each of the security device interfaces in the broadcast domain, including itself. In this example, security device interface 170Ai-2 sends a zero hop service request to security device 170Ai-1 in action 2.3.1, to security device interface 170Ai-2 in action 2.3.2, and to security device interface 170Bi in action 2.3.3. Security device interface 170Ai-2 then evaluates replies to the address query and use the information obtained to assign an owner to workstation 160D.

FIG. 2C shows an address query sent by one of the security device interfaces of FIG. 2B to the workstation of FIG. 2A in response to the initiation of the zero hop ownership determination algorithm in FIG. 2B. In this example, security device interface 170Ai-1 sends an address query to workstation 160D via connection 140A-11 through switch 150A in action 2.4.1. The query passes through connection 140A-4 from switch 150A to switch 150B in action 2.4.2. The query then passes through connection 140A-6 from switch 150B to workstation 160D in action 2.4.3.

FIG. 2D shows an address query sent by another one of the security device interfaces of FIG. 2B to the workstation of FIG. 2A in response to the initiation of the zero hop ownership determination algorithm in FIG. 2B. In this example, security device interface 170Ai-2 sends an address query to workstation 160D via connection 140A-12 to switch 150B in action 2.5.1. The query then passes through connection 140A-6 from switch 150B to workstation 160D in action 2.5.2.

FIG. 2E shows an address query sent by another one of the security device interfaces of FIG. 2B to the workstation of FIG. 2A in response to the initiation of the zero hop ownership determination algorithm in FIG. 2B. In this example, security device interface 170Bi sends an address query to workstation 160D via connection 140A-13 through switch 150C in action 2.6.1. The query passes through connection 140A-7 from switch 150C to switch 150B in action 2.6.2. The query then passes through connection 140A-6 from switch 150B to workstation 160D in action 2.6.3.

FIG. 2F shows a reply sent by workstation 160D in response to the address query of FIG. 2C and the associated reply counts by the security device interfaces. In this example, workstation 160D sends a reply to the address query to security device interface 170Ai-1 via connection 140A-6 through switch 150B in action 2.7.1. When the reply passes through switch 150B, the reply is observed by interface 170Ai-2 and counted, making the reply count for interface 170Ai-2 have a value of one. The reply then passes from switch 150B through connection 140A-4 to switch 150A in action 2.7.2. When the reply passes through switch 150A, the reply is observed by interface 170Ai-1 and counted, making the reply count for interface 170Ai-1 have a value of one. The query then passes through connection 140A-11 from switch 150A to security device interface 140A-11 in action 2.7.3. Because switch 150C is not involved in this communication, the reply count for security device interface 170Bi remains at zero.

FIG. 2G shows a reply sent by workstation 160D in response to the address query of FIG. 2E and the associated reply counts by the security device interfaces. In this example, workstation 160D sends a reply to the address query to security device interface 170Bi via connection 140A-6 through switch 150B in action 2.8.1. When the reply passes through switch 150B, the reply is observed by interface 170Ai-2 and counted, making the reply count for interface 170Ai-2 have a value of two. The reply then passes through connection 140A-7 to switch 150C in action 2.8.2. When the reply passes through switch 150C, the reply is observed by interface 170Bi and counted, making the reply count for interface 170Bi have a value of one. The reply then passes through connection 140A-13 to interface 170Bi in action 2.8.3. Because switch 150A is not involved in this communication, the reply count for security device interface 170Ai-1 remains at one.

FIG. 2H shows a reply sent by workstation 160D in response to the address query of FIG. 2D and the associated reply counts by the security device interfaces. In this example, workstation 160D sends a reply to the address query to security device interface 170Ai-2 via connection 140A-6 through switch 150B in action 2.9.1. When the reply passes through switch 150B, the reply is observed by interface 170Ai-2 and counted, making the reply count for interface 170Ai-2 have a value of three. The reply then passes from switch 150B through connection 140A-12 to interface 170Ai-2 in action 2.9.2. Because neither switch 150A or switch 150C is involved in this communication, the reply counts for security device interfaces 170Ai-1 and 170Bi remain at one.

At the termination of the zero hop ownership determination algorithm, security device 170Ai-2 has observed three replies, whereas security device interfaces 170Ai-1 and 170Bi have each observed only one reply. This determination has been made by merely observing communication passing through the switches 150A, 150B, and 150C in LAN 140A without being in-line. Rather than querying the switches for a time between the address query and the reply, the closest security device interface has been determined by passive observation only.

One of skill in the art will understand that the data flows through FIGS. 2A through 2H can be accomplished by several implementations of an algorithm using reply counts as an approximation of physical proximity. One embodiment of the zero hop ownership determination algorithm is described with reference to FIGS. 3 through 11.

Figure 3:
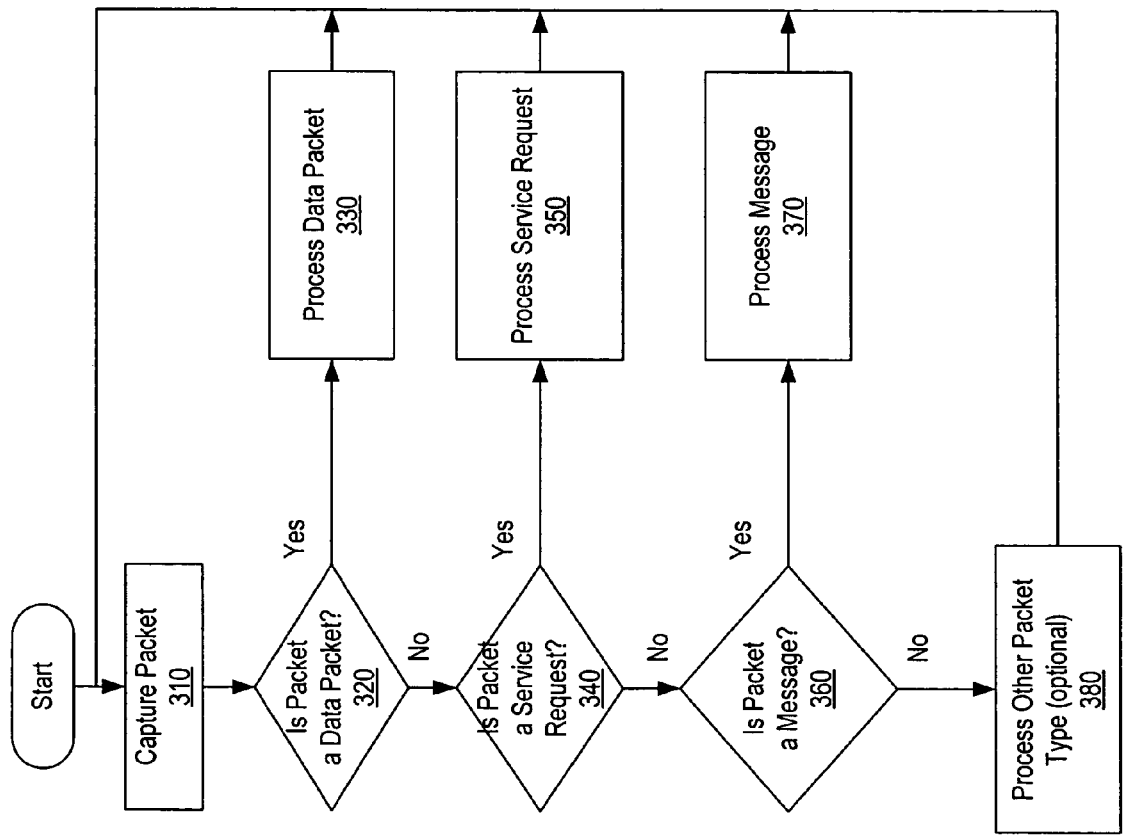
FIG. 3 is a flowchart depicting one embodiment of a method for processing packets in accordance with the present invention.

FIG. 3 is a flowchart depicting one embodiment of a method for processing packets in accordance with the present invention. The method begins with capturing a network packet from the local segment (also referred to herein as a "broadcast domain" or "broadcast horizon") in "Capture Packet" step 310. This packet may be a network packet comprising data for various protocols including ARP, TCP, IP, HTTP, UDP, or FTP, among others. In one embodiment, the packet is captured by an interface for a security device, such as interface 170Ai-1 for security device 170A of FIG. 1. Control then proceeds to "Is Packet a Data Packet" decision point 320, where a determination is made whether the packet being processed is a data packet.

At "Is Packet a Data Packet" decision point 320, the determination whether a packet is a data packet is made. In one embodiment, the determination whether a packet is a data packet can be made by examining the header of the packet for an indication that the packet contains a message or service request following a protocol used for communication related to the zero hop determination algorithm. If no indication is found, control passes to "Process Data Packet" step 330, where address information in the packet header is examined, and the packet is passed to its destination as a normal data packet. "Process Data Packet" step 330 is described in further detail with reference to FIGS. 4A and 4B below.

At "Is Packet a Data Packet" decision point 320, if the packet is not a data packet, control proceeds to "Is Packet a Service Request" decision point 340. At "Is Packet a Service Request" decision point 340, the header of the packet is examined for an indication that the packet is a service request. If so, control proceeds to "Process Service Request" step 350.

"Process Service Request" step 350 is described in further detail with reference to FIG. 5.

At "Is Packet a Service Request" decision point 340, if the packet is not a service request, control proceeds to "Is Packet a Message" decision point 360. At "Is Packet a Message" decision point 360, the header of the packet is examined for an indication that the packet is a message. If so, control proceeds to "Process Message" step 370. "Process Message" step 370 is described in further detail with reference to FIG. 6.

At "Is Packet a Message" decision point 360, if the packet is not a message, control proceeds to "Process Other Packet Type (optional)" step 380. Other types of packets can be processed in specific ways in accordance with the specific needs of the organization's networking environment. In addition, it is not necessary for operation of the invention that service requests and messages are processed separately from data packets as shown in FIG. 3. The types of packets and processing paths shown in FIG. 3 are just one example of an implementation of the invention.

Figure 4A:
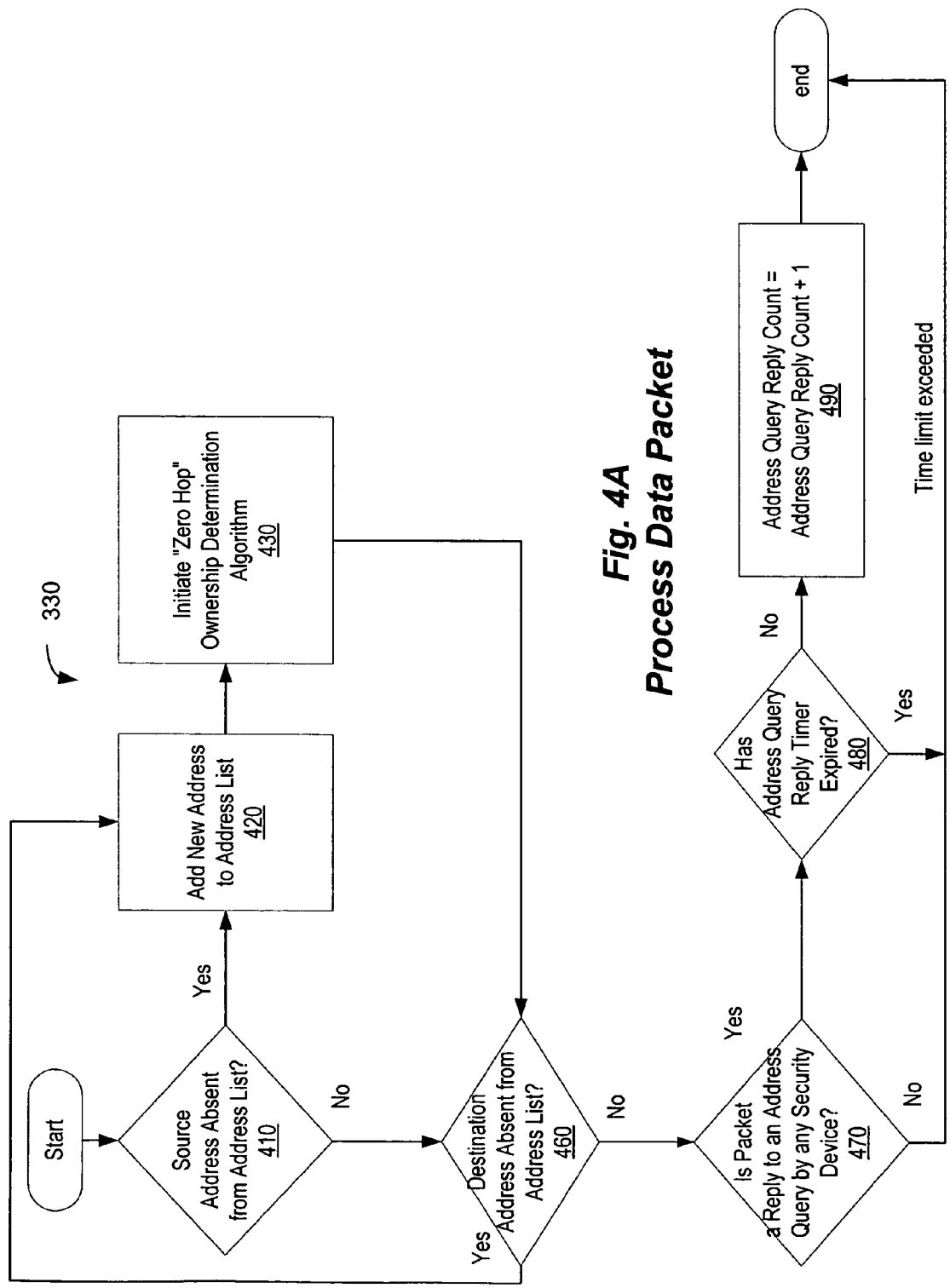
FIG. 4A is a flowchart depicting one embodiment of a method for implementing the "Process Data Packet" step of the flowchart of FIG. 3.

FIG. 4A is a flowchart depicting one embodiment of a method for implementing the "Process Data Packet" step of the flowchart of FIG. 3. At "Source Address Absent from Address List" step 410, the source address of the packet is compared to addresses of known devices maintained by the entity (e.g., the security device or security device interface) capturing the packet. The entity capturing the packet is referred to herein as a "security device interface" or "interface" herein, although one of skill in the part will recognize that other types of devices may be adapted to perform the methods described herein. If the source address is absent from the address list, communication with the source address has not been observed by the security device interface maintaining the address list. Observing communication with a source address for the first time occurs, for example, when the network is initially started or when a device having the source address is added to the network.

From "Source Address Absent from Address List" decision point 410, if the source address is absent, control proceeds to "Add New Address to Address List" step 420, where the new source address is added to the address list for the security device interface. At "Source Address Absent from Address List" decision point 410, if the source address is not absent (i.e., the source address appears in the address list), control proceeds to "Destination Address Absent from Address List" decision point 460. Processing the destination address is described in further detail below.

From "Add New Address to Address List" step 420, control proceeds to "Initiate Zero Hop Ownership Determination Algorithm" step 430. In this example, the newly observed source address is the address for which an owner is determined by the zero hop algorithm. Details of "Initiate Zero Hop Ownership Determination Algorithm" step 430 are discussed with reference to FIG. 4B. After "Initiate Zero Hop Ownership Determination Algorithm" step 430 has completed, one of the security device interfaces has been assigned as owner of the source address. Control proceeds to "Destination Address Absent from Address List" decision point 460.

At "Destination Address Absent from Address List" decision point 460, if the destination address is absent from the address list, control proceeds to "Add New Address to Address List" step 420. Control then proceeds to "Initiate Zero Hop Ownership Determination Algorithm" step 430. In this case, the zero hop ownership determination algorithm is initiated for the destination address. After the zero hop ownership algorithm is completed, one of the security device interfaces is assigned as the owner of the destination address. At "Destination Address Absent from Address List" decision point 460, if the destination address is present in the address list, control proceeds to "Is Packet a Reply to an Address Query by Any Security Device" decision point 470.

At "Is Packet a Reply to an Address Query by Any Security Device" decision point 470, a determination is made whether the packet is a reply to an address query made by one of the security device interfaces. If the packet is a reply to an address query, control proceeds to "Has Address Query Reply Timer Expired" decision point 480. If the instance of the address reply counter timer associated with the address sending the reply has not expired, control proceeds to "Address Query Reply Counter=Address Query Reply Counter+1" step 490. In this step, the security device interface processing the data packet has observed a reply from a given target address and adds one to the number of replies observed for that target address. If the timer has expired at "Has Address Query Reply Timer Expired" decision point 480, the reply is not counted and processing the data packet is complete. Expiration of the address query reply timer before all replies are received causes the zero hop algorithm to terminate, as further described below.

Figure 4B:
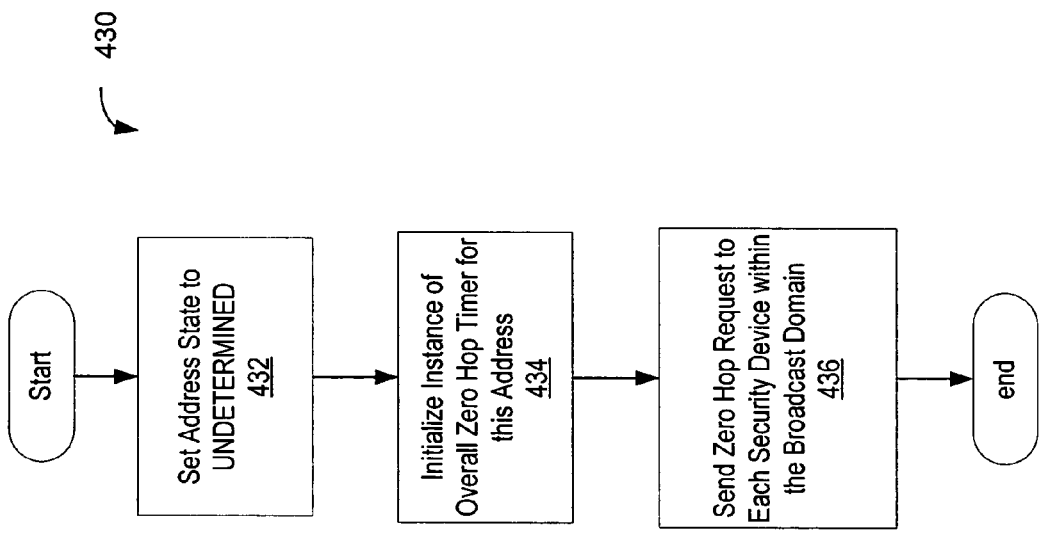
FIG. 4B is a flowchart depicting one embodiment of a method for implementing the "Initiate Zero Hop Ownership Determination Algorithm" step of the flowchart of FIG. 4A.

FIG. 4B is a flowchart depicting one embodiment of a method for implementing the "Initiate Zero Hop Ownership Determination Algorithm" step 430 of the flowchart of FIG. 4A. An owner will be determined for an address specified by the security device interface initiating the zero hop determination process. The address may be a source address or a destination address for communication observed by the security device interface, as described with reference to FIG. 4A. In one embodiment, each security device maintains an address for each of the other security devices as well as an address list of devices from which the security device has observed communication. In "Set Address State to UNDETERMINED" step 430, the state of the address is set to a value of "undetermined" in the address list until the zero hop ownership determination algorithm identifies an interface to be assigned as the "owner" of the address. Control then proceeds to "Initialize Instance of an Overall Zero Hop Timer" step 440, where an instance of an overall zero hop algorithm timer created specifically for the address is set to an initial value (such as 10 seconds). The two steps "Set Address State to UNDETERMINED" step 430 and "Initialize an Instance of an Overall Zero Hop Timer" step 440 are used to ensure that the zero hop algorithm ultimately ends and does not enter an infinite loop if all responses are not received. Other embodiments may use different methods for ensuring that the zero hop algorithm terminates.

Control then proceeds to "Send Zero Hop Request to Each Security Device within the Broadcast Domain" step 450. A service request to begin the zero hop ownership determination algorithm is sent to each security device (or security device interface) in the broadcast domain (including the security device interface sending the zero hop request). The overall zero hop timer is initialized as described above to a value that allows sufficient time for every security device to receive the service request to initiate and complete the zero hop algorithm for the address of interest. In one embodiment, when each security device comes online, that security device broadcasts information to identify itself to other security devices present on the network. Therefore, each security device has knowledge of the other security devices to which to send the zero hop request. After sending the zero hop request to all security devices in the broadcast domain, the security device interface processing the data packet has initiated the process of determining an owner for the address. Each of the security devices will receive the zero hop request and process the zero hop request as a service request in accordance with the "Process Service Request" step of FIG. 350 of FIG. 3, as further described below with reference to FIG. 5.

Figure 5:
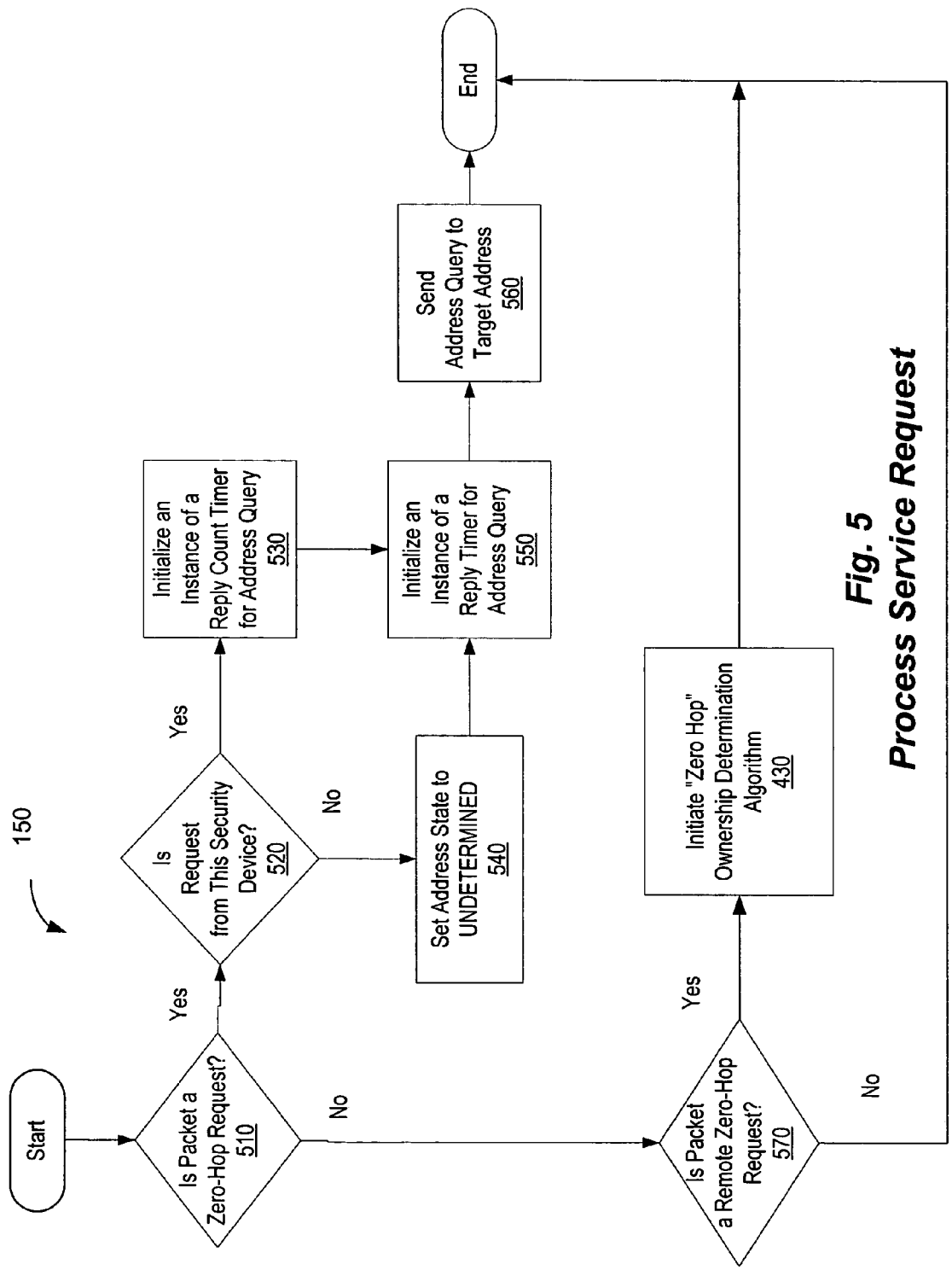
FIG. 5 is a flowchart depicting one embodiment of a method for implementing the "Process Service Request" step of the flowchart of FIG. 3.

FIG. 5 is a flowchart depicting one embodiment of a method for implementing the "Process Service Request" step of the flowchart of FIG. 3. At "Is Packet a Zero hop Request" decision point 510, a determination is made whether the service request is a zero hop request. If so, control proceeds to "Is Request from this Security Device" decision point 520. If not, control proceeds to "Is Packet a Remote Zero hop Request" decision point 570.

At "Is Request from this Security Device" decision point 520, a determination is made whether the request is from the security device processing the service request. (Recall that in "Send Zero Hop Request to Each Security Device within the Broadcast Domain" step 450 of FIG. 4, each security device sends a message to every security device in the broadcast domain, including itself.) If the security device is processing its own zero hop service request, the security device is about to send an address query to the target address specified in the zero hop request. Control proceeds to "Initialize an Instance of a Reply Count Timer for Address Query" step 530 and then proceeds to "Initialize an Instance of a Reply Timer for Address Query" step 550. These respective timers are discussed in further detail below. Control proceeds to "Send Address Query to Target Address" step 560. In this step, the security device interface processing the zero hop request sends an address query to the target address indicated in the zero hop request.

The two timers described above are a reply count timer and a reply timer. A reply count timer sets a limit on the time allowed for all other security devices to send a respective count of replies from the target address that are observed by that security device. In one embodiment, this timer is set to an initial value of four seconds. The reply timer sets a limit on the time that the security device interface processing the zero hop request waits for a reply from the target address. In one embodiment, this timer is set to three seconds. The reply timer has a smaller initial value because the reply timer is waiting for a reply from only one address, the target address. In contrast, the reply count timer is waiting for a reply from each security device in the broadcast domain. Note that these particular timers are but one example of an implementation of the zero hop algorithm and are used to ensure that the algorithm is ultimately terminated.

At "Is Request from this Security Device" decision point 520, if the security device is processing a zero hop service request from another security device, control proceeds to "Set Address State to UNDETERMINED" step 540. The state of the address specified in the zero hop service request is changed in the security device interface's address list to indicate that the zero hop algorithm for that address is currently being determined. Control then proceeds to "Initialize an Instance of a Reply Timer for Address Query" step 550 and continues as described above.

At "Is Packet a Zero hop Request" decision point 510, if the packet is not a zero hop request, control proceeds to "Is Packet a Remote Zero hop Request" decision point 570. If the packet is not a remote zero hop request, the algorithm terminates. If the packet is a remote zero hop request, another security device interface has determined that the security device receiving the remote zero hop request had a higher reply count and should initiate the zero hop algorithm to determine whether it should own the address in question. Control proceeds to "Initiate 'Zero Hop' Ownership Determination Algorithm" step 430, as described earlier with reference to FIG. 4B. Processing the service request is then complete.

Figure 6:
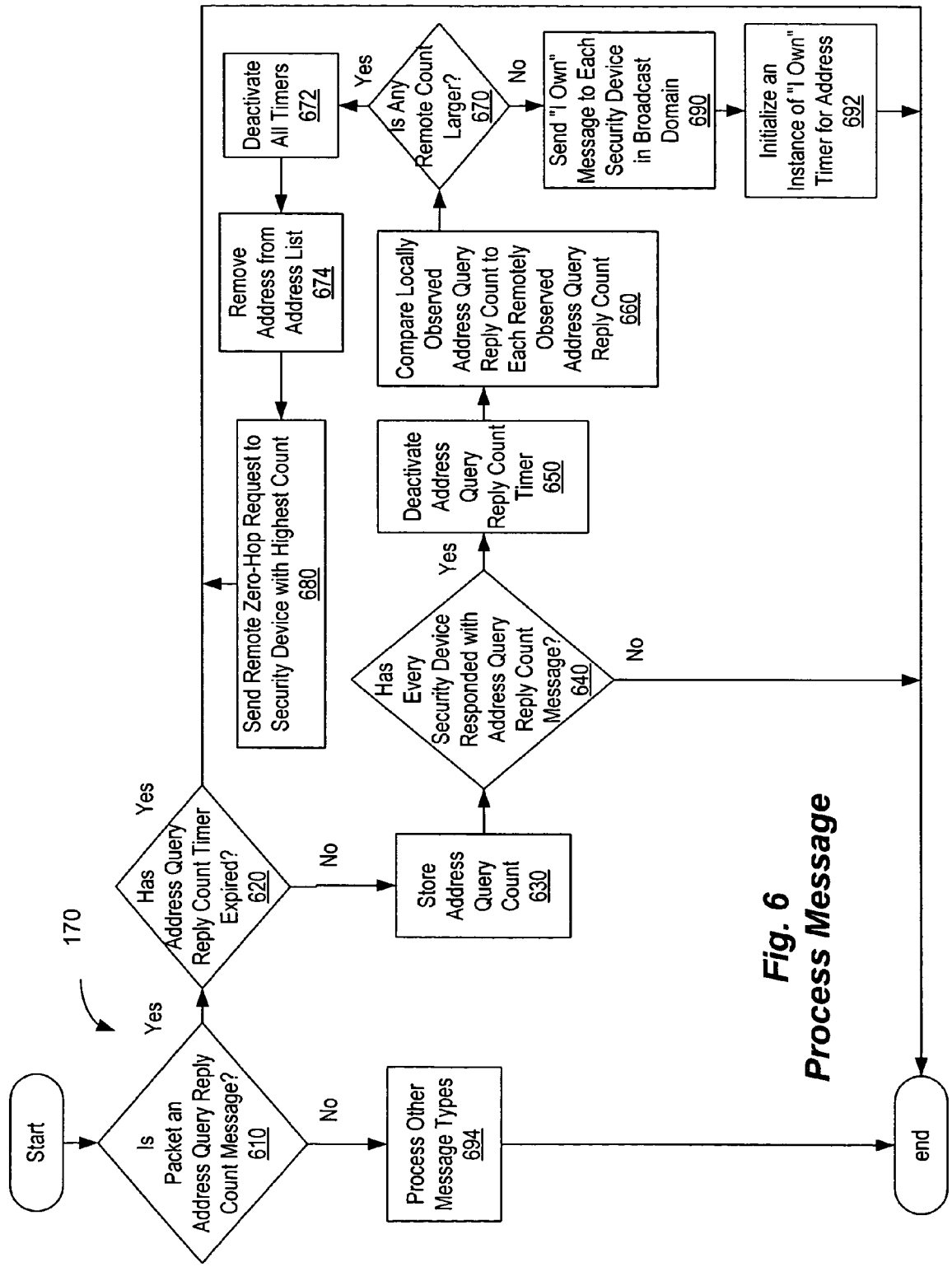
FIG. 6 is a flowchart depicting one embodiment of a method for implementing the "Process Message" step of the flowchart of FIG. 3.

FIG. 6 is a flowchart depicting one embodiment of a method for implementing the "Process Message" step of the flowchart of FIG. 3. At "Is Packet an Address Query Reply Count Message" decision point 610, a determination is made whether the packet contains a message with a count of a number of replies observed by a security device interface in response to an address query. If the packet is not an address query reply count message, control proceeds to "Process Other Message Types" step 694. Processing of other message types is discussed further with reference to FIG. 7 below.

At "Is Packet a Address Query Reply Count Message" decision point 610, if the packet is an address query reply count message, control proceeds to "Has Address Query Reply Count Timer Expired" step 620. If the address query reply count timer started in "Initialize an Instance of a Reply Count Timer for Address Query" step 530 of FIG. 5 has expired, the reply count message is too late to be counted and is discarded. If the address query reply count timer has not expired, control proceeds to "Store Address Query Count" step 630. The reply count reported by the security device interface sending the reply count message is stored along with an indicator of the security device interface, and control proceeds to "Has Every Security Device Responded with Address Query Reply Count Message" decision point 640.

At "Has Every Security Device Responded with Address Query Reply Count Message" decision point 640, if every device has responded, the owner can be determined. Control proceeds to "Deactivate Address Query Reply Count Timer" step 650. Control then proceeds to "Compare Locally Observed Address Query Reply Count to Each Remotely Observed Address Query Reply Count" step 660. The Control then proceeds to "Is Any Remote Count Larger" decision point 670. If another security device interface has reported a reply count that is larger, that security device interface is likely to be closer to the target address. A remote zero hop request will be sent to that security device so that the zero hop ownership determination algorithm can be initiated by the security device having the higher count.

From "Is Any Remote Count Larger" decision point 670, control proceeds to "Deactivate All Timers" step 672, then to "Remove Address from Address List" step 674, where the target address is removed from the address list for the security device processing the address query reply count message. In effect, the security device interface that initiated the zero hop ownership determination algorithm abandons its own determination of ownership when a higher reply count is reported by another security device interface. Control then proceeds to "Send Remote Zero Hop Request to Security Device with Highest Count" step 680. The security device interface with the highest reply count will then initiate the zero hop ownership determination algorithm.

At "Is Any Remote Count Larger" decision point 670, if no remote reply count is larger, the security device interface processing the address query reply count message can declare itself as the owner of the target address. It is possible that other security device interfaces may report the same number of replies as the security device interface processing the address query reply count message, but the security device interface that initiated the zero hop ownership determination algorithm can declare itself as the owner in the event of a tie. The security device interface broadcasts its own declaration of ownership in "Send 'I Own' Message to Each Security Device in the Broadcast Domain" step 690. Control proceeds to "Initialize an Instance of 'I Own' Timer" step 692 to set a timer to ensure that other security device interfaces in the broadcast domain agree with the determination of ownership.

Processing of the 'I Own' message type is discussed further with reference to FIG. 7 below.

Figure 7:
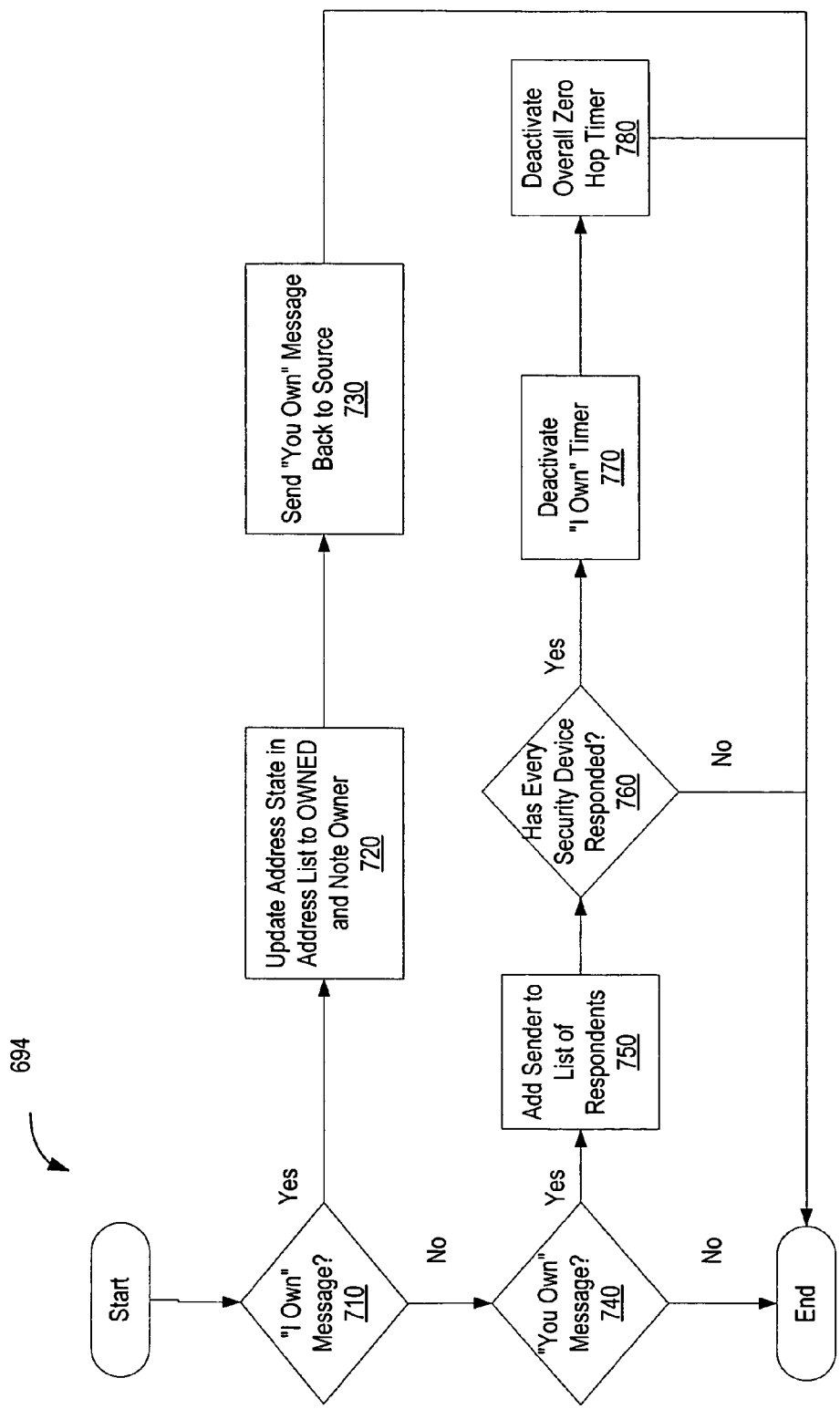
FIG. 7 is a flowchart depicting one embodiment of a method for implementing the "Process Other Message Types" step of the flowchart of FIG. 6.

FIG. 7 is a flowchart depicting one embodiment of a method for implementing the "Process Other Message Types" step of the flowchart of FIG. 6. At "'I Own' Message" decision point 710, a determination is made whether the current packet is an "I Own" message. Each security device interface is sent an "I Own" message when an initiator of the zero hop determination algorithm declares itself as the owner of a given address. In response to receiving the "I Own" message, a security device interface updates its address list in "Update Address State in Address List to OWNED and Note Owner" step 720. Control then proceeds to "Send 'You Own' Message Back to Source" step 730, where the security device interface sends a "You Own" message back to the sender of the "I Own" message. Processing the "I Own" message is then complete.

At "'I Own' Message" decision point 710, if the message is not an "I Own" message, control proceeds to "You Own' Message" decision point 740. If the packet is a "You Own" message, control proceeds to "Add Sender to List of Respondents" step 750. Each security device interface maintains a list of respondents to its "I Own" message. All security device interfaces should respond with a "You Own" message before the "I Own" timer expires. Control proceeds to "Has Every Security Device Responded" decision point 760. If all security devices have not yet responded, processing the "You Own" message is complete and the security device interface waits for the remaining responses until the "I Own" timer expires. The "I Own" timer is discussed further with reference to FIG. 11 below.

If all security devices have responded at "Has Every Security Device Responded" decision point 760, control proceeds to "Deactivate 'I Own' Timer" step 770, where the "I Own" timer is deactivated. Control then proceeds to "Deactivate Overall Zero Hop Timer" step 780, where the timer for the zero hop algorithm is terminated. At this point, an owner has been determined for the address and each security device interface has updated its address list to note the owner for the address. The owner for the address will perform any mitigation needed with reference to that address.

Figure 8:
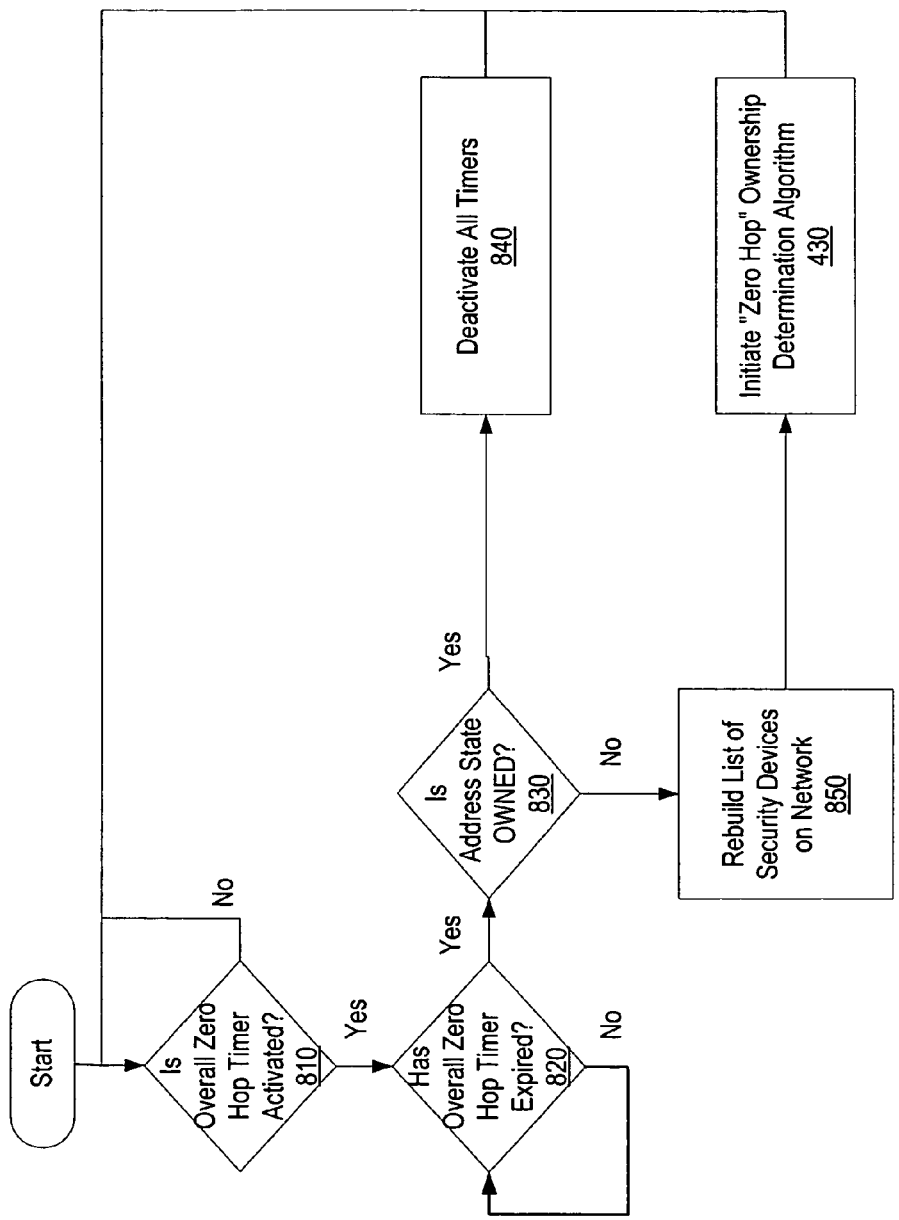
FIG. 8 is a flowchart of the operation of an overall zero hop algorithm timer used in one embodiment of the invention.

FIG. 8 is a flowchart of the operation of an overall zero hop algorithm timer used in one embodiment of the invention. The flowchart begins operation when the overall zero hop timer is activated for a given address, as described with reference to "Initialize Instance of Overall Zero Hop Timer for this Address" step 434 of FIG. 4B. The overall zero hop timer for a given address is tested repeatedly at "Is Overall Zero Hop Timer Activated" decision point 810. When the overall zero hop timer is activated, control proceeds to "Has Overall Zero Hop Timer Expired" decision point 820. The overall zero hop timer is again tested repeatedly at "Has Overall Zero Hop Timer Expired" decision point 820. When the overall zero hop timer expires, control proceeds to "Is Address State OWNED" decision point 830. If the overall zero hop timer has expired and the address state is owned, the zero hop ownership determination algorithm has completed successfully and an owner has been assigned to the address. Control proceeds to "Deactivate All Timers" decision point 840 and then returns to "Is Overall Zero Hop Timer Activated" decision point 810 to await activation of the overall zero hop timer again.

At "Is Address State OWNED" decision point 830, if the overall zero hop timer has expired and the address state is not OWNED, control proceeds to "Rebuild List of Security Devices on Network" step 850. The overall zero hop timer has expired without determining an owner for the address. Such a situation can occur, for example, when one of the devices or a communication link within the broadcast domain has failed. With such a failure, the target address may not have responded to the address query or at least one of the security device interfaces may not have provided an address query reply count. The list of security devices on the network is rebuilt to ensure that all online devices in the broadcast domain participate in the zero hop ownership determination algorithm and that no offline devices are included. Control then proceeds to "Initiate 'Zero Hop' Ownership Determination Algorithm" step 430, which proceeds as described with reference to FIG. 4B above.

Figure 9:
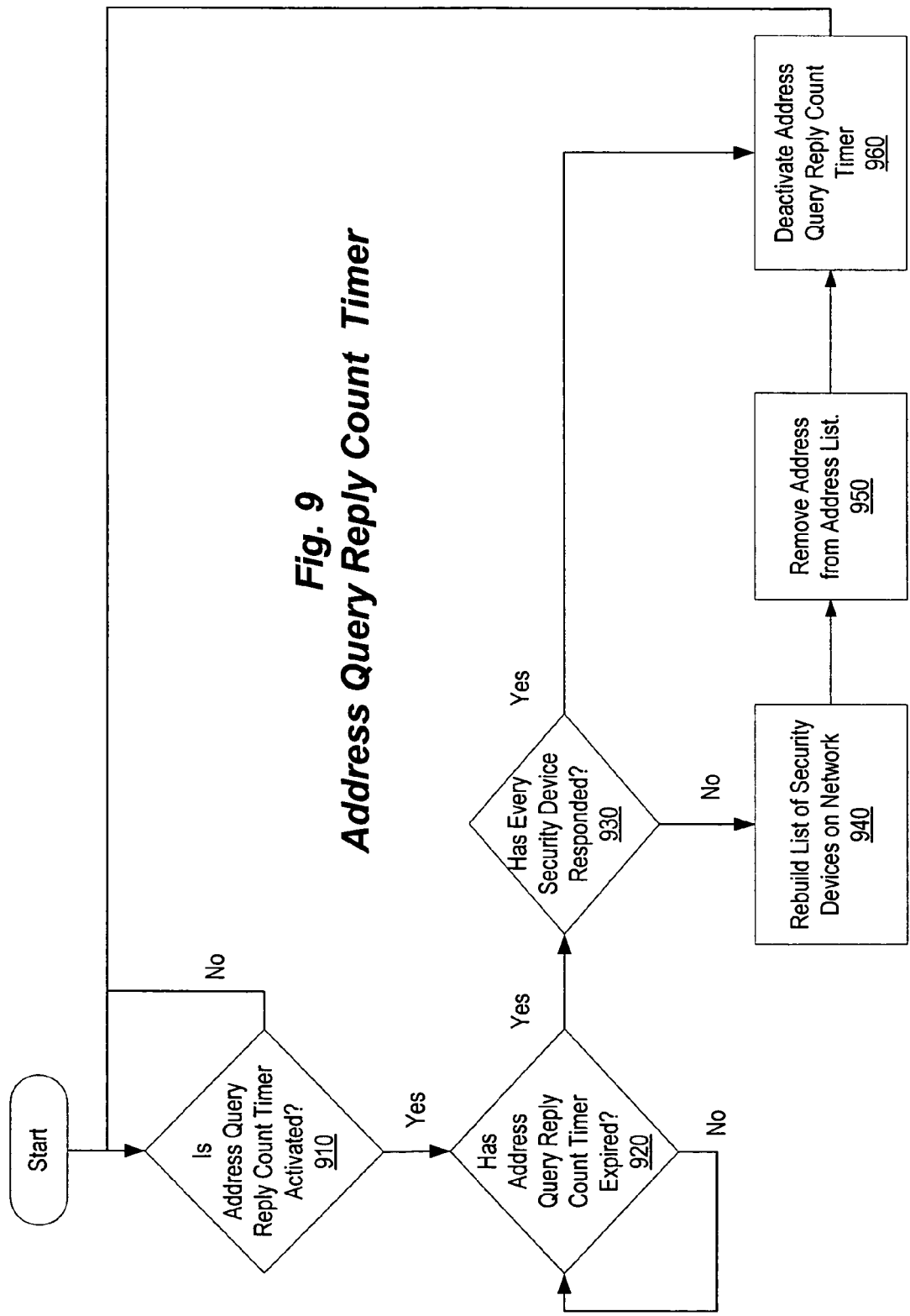
FIG. 9 is a flowchart of the operation of an address query reply count timer used in one embodiment of the invention.

FIG. 9 is a flowchart of the operation of an address query reply count timer used in one embodiment of the invention. The flowchart begins operation when the address query reply count timer is activated for a given address, as described with reference to "Initialize an Instance of Reply Count Timer for Address Query" step 530 of FIG. 5. The address query reply count timer for a given address is tested repeatedly at "Is Address Query Reply Count Timer Activated" decision point 910. When the address query reply count timer is activated, control proceeds to "Has Address Query Reply Count Timer Expired" decision point 920.

The address query reply count timer is again tested repeatedly at "Has Address Query Reply Count Timer Expired" decision point 920. When the address query reply count timer expires, control proceeds to "Has Every Security Device Responded" decision point 930. If the address query reply count timer has expired and all security device interfaces have responded, the address query reply count timer is no longer needed and control proceeds to "Deactivate Address Query Reply Count Timer" step 960. The address query reply count timer is deactivated, and control returns to "Is Address Query Reply Count Timer Activated" decision point 910 to await activation of the address query reply count timer again.

At "Has Every Security Device Responded" decision point 930, if all security devices have not responded before the address reply count timer has expired, it is possible that a device or a communication link has failed. Control proceeds to "Rebuild List of Security Devices on Network" step 940 to reconstruct the list of active devices in the broadcast domain. Control then proceeds to "Remove Address from Address List" step 950, and the address for which all reply counts were not received is removed from the address list for the security device awaiting reply counts. Control then proceeds to "Deactivate Address Query Reply Count Timer" step 960. The address query reply count timer is deactivated, and control returns to "Is Address Query Reply Count Timer Activated" decision point 910 to await activation of the address query reply count timer again.

Figure 10:
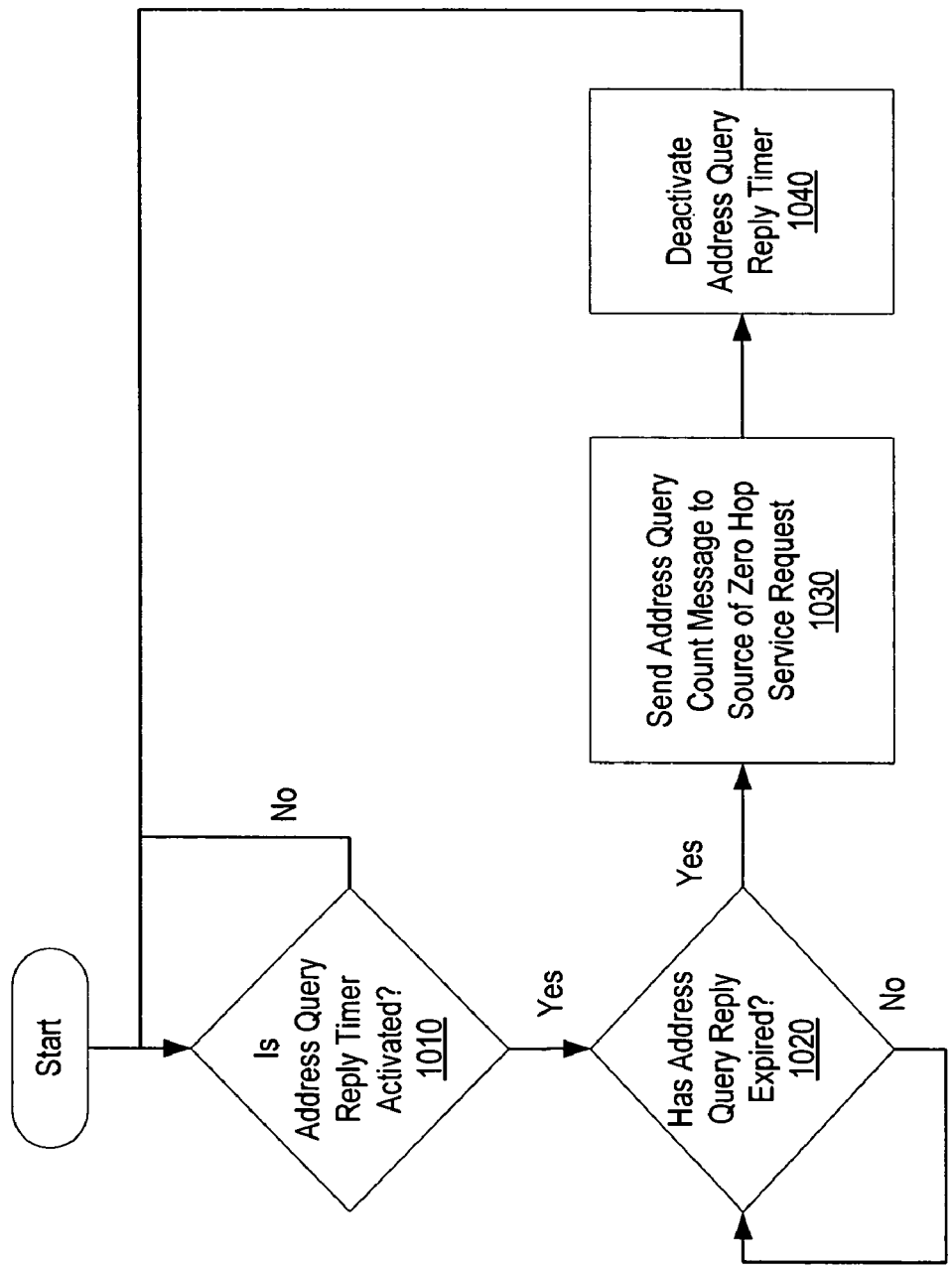
FIG. 10 is a flowchart of the operation of an address query reply timer used in one embodiment of the invention.

FIG. 10 is a flowchart of the operation of an address query reply timer used in one embodiment of the invention. Expiration of the address query reply timer causes a security device interface to send a count of the number of replies to an address query that were observed by that security device interface. The flowchart begins operation when the address query reply timer is activated for a given address, as described with reference to "Initialize an Instance of a Reply Timer for Address Query" step 550 of FIG. 5. The address query reply timer for a given address is tested repeatedly at "Is Address Query Reply Timer Activated" decision point 1010. When the address query reply timer is activated, control proceeds to "Has Address Query Reply Timer Expired" decision point 1020.

The address query reply timer is again tested repeatedly at "Has Address Query Reply Timer Expired" decision point 1020. When the address query reply timer expires, control proceeds to "Send Address Query Count Message to Source of Zero Hop Service Request" step 1030. Each security device sends a count of the number of reply messages observed to the source of the zero hop service request. As described above, the security device interface that initiated the zero hop ownership determination algorithm will receive the counts from each security device interface in the broadcast domain and use the counts to assign an owner of the address, as described with reference to FIG. 6. Control then proceeds to "Deactivate Address Query Reply Timer" step 1040. The address query reply timer is deactivated, and control returns to "Is Address Query Reply Timer Activated" decision point 1010 to await activation of the address query reply timer again.

Figure 11:
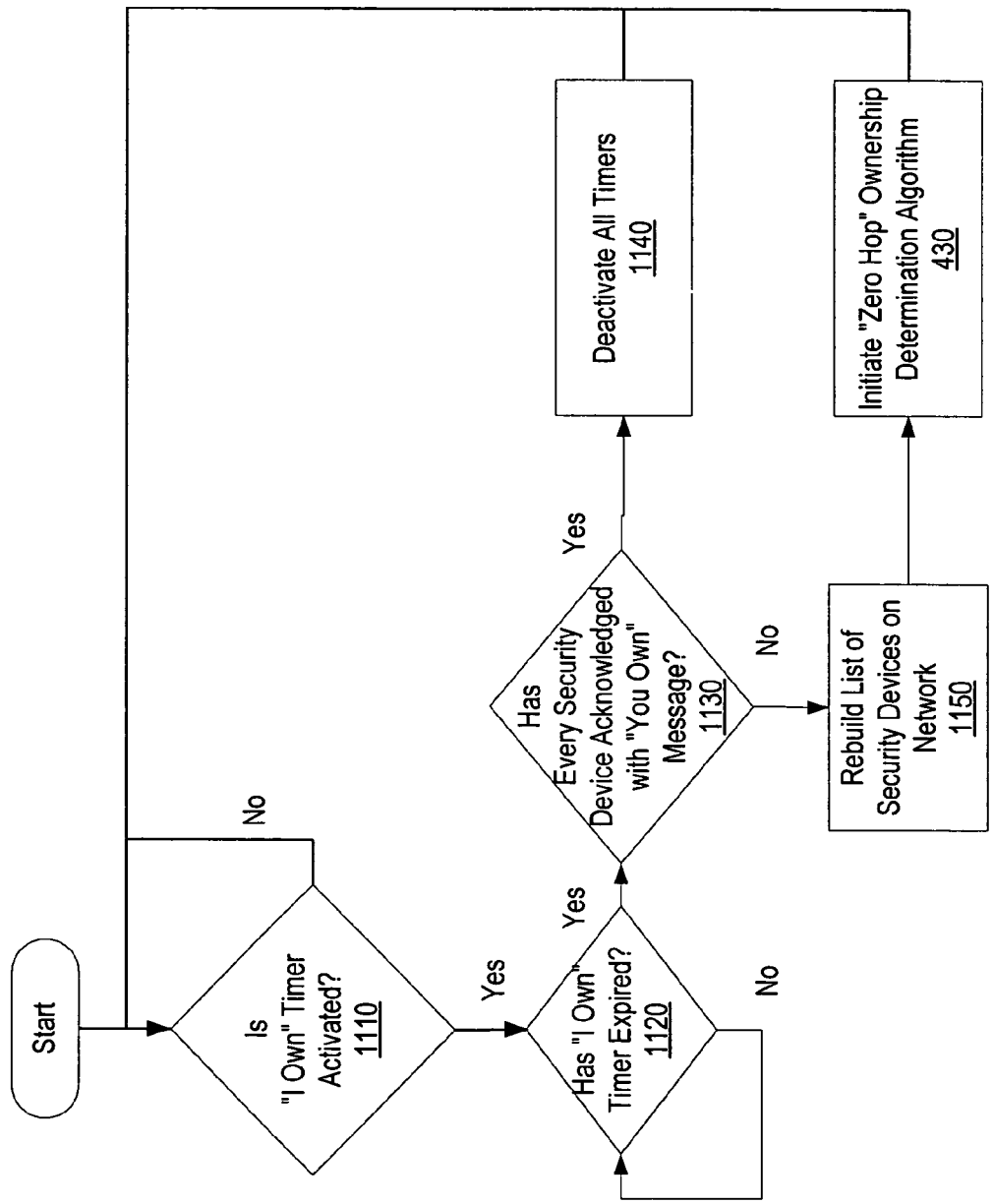
FIG. 11 is a flowchart of the operation of an "I Own" timer used in one embodiment of the invention.

FIG. 11 is a flowchart of the operation of an "I Own" timer used in one embodiment of the invention. The flowchart begins operation when the "I Own" timer is activated for a given address, as described with reference to "Initialize an Instance of 'I Own' Timer for Address" step 692 of FIG. 6. The "I Own" timer for a given address is tested repeatedly at "Is 'I Own' Timer Activated" decision point 1110. When the "I Own" timer is activated, control proceeds to "Has 'I Own' Timer Expired" decision point 920.

The "I Own" timer is tested repeatedly at "Has 'I Own' Timer Expired" decision point 1120. When the "I Own" timer expires, control proceeds to "Has Every Security Device Acknowledged with 'You Own' Message" decision point 1130. If the "I Own" timer has expired and all security device interfaces have responded with a "You Own" message, all security device interfaces in the broadcast domain are synchronized with reference to the owner of the address. Control proceeds to "Deactivate All Timers" step 1160, where all timers for the zero hop ownership determination algorithm are deactivated. Control returns to "Is 'I Own' Timer Activated" decision point 1110 to await activation of the "I Own" timer again.

At "Has Every Security Device Acknowledged with 'You Own' Message" decision point 1130, if all security devices have not responded before the "I Own" timer has expired, it is possible that a device or a communication link has failed. Control proceeds to "Rebuild List of Security Devices on Network" step 150 to reconstruct the list of active devices in the broadcast domain. Control then proceeds to "Initiate 'Zero Hop' Ownership Determination Algorithm" step 430 to again determine an owner for the address using a current list of active devices, as described above with reference to FIG. 4B. Control then returns to "Is 'I Own' Timer Activated" decision point 1110 to await activation of the "I Own" timer again.

The zero hop ownership determination algorithm of the present invention provides many advantages. Once an attack has infiltrated a network, it can be identified by a security device closest to the source or target of the attack and mitigated to prevent spreading the problem to other parts of the network. The security device interface of the present invention operates in a heterogenous environment without the need to query switches. Because the security device interface passively determines the closest interface, no delay in network traffic or point of vulnerability is introduced into the network. Because the security device interface is not in-line, a single device can protect a given network, rather than requiring a redundant device to avoid a potential communication failure.

The security device interface described herein provides a counting module, means, and/or instructions to count a respective number of replies observed by a respective interface. Each reply is made in response to a respective request for one address. The security device interface also provides an assigning module, means and/or instructions to assign a responsible interface to the one address using the respective number of replies observed by each respective interface. The security device interface can also include a managing module, means, and/or instructions to manage communication with the one address in response to being assigned as the responsible interface. The security device interface can also include a sending module, means, and/or instructions to send a message, such as the "I Own" message described herein, to the other interfaces in response to being assigned as the responsible interface for the one address. Furthermore, the security device interface can include a second sending module, means, and/or instructions to send a second message, such as a "You Own" message described herein, to a second interface in response to receiving the message from the second interface. The second message indicates that the second interface is the responsible interface for the one address.

A system, method, apparatus and computer-readable medium have been described to identify and mitigate attacks on a network. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A computer-implemented method comprising: for each respective interface of a plurality of interfaces in a network, counting a respective number of replies observed by the respective interface, wherein each reply of the replies is made in response to a respective request of a plurality of requests, and each request of the plurality of requests is for one address; assigning a responsible interface of the plurality of interfaces to the one address using the respective number of replies observed by each respective interface; the plurality of interfaces and the one address are within a broadcast domain; managing communication with the one address in response to being assigned as the responsible interface, the managing the communication comprises redirecting communication sent by the one address in response to determining that the one address is a threat; and sending a message to each interface of the plurality of interfaces in response to being assigned as the responsible interface for the one address.

2. The method of claim 1 wherein
the plurality of interfaces and the one address are within a segment of the network.

3. The method of claim 1 wherein
the network is a virtual network.

4. The method of claim 1 wherein
the counting is performed at a data link layer of the network.

5. The method of claim 1 wherein
at least one of the plurality of interfaces operates in promiscuous mode.

6. The method of claim 1 wherein
no interface of the plurality of interfaces is in-line on the network.

7. The method of claim 1 wherein
the managing the communication comprises gathering statistical information about the communication with the one address.

8. The method of claim 1 wherein
the managing the communication comprises
changing a state of the one address upon determining that no communication with the one address has occurred for a period of time.

9. The method of claim 1 wherein
the managing the communication comprises
performing mitigation during communication with the one address.
10. The method of claim 9 wherein
the performing the mitigation occurs in response to determining that the one address is a threat.
11. The method of claim 1 wherein
the redirecting the communication occurs in response to determining that the one address is a threat.
12. The method of claim 1 further comprising:
sending a message to each interface of the plurality of interfaces in response to being assigned as the responsible interface for the one address.
13. The method of claim 1 further comprising: in response to receiving the message from a second interface, sending a second message to the second interface, wherein the second message indicates that the second interface is the responsible interface for the one address.
14. The method of claim 1 wherein
at least one respective request of the plurality of requests is sent by each respective interface of the plurality of interfaces to the one address.
15. The method of claim 1 wherein
the assigning the responsible interface comprises
determining a largest number of replies from the respective number of replies for each respective interface, and
identifying one respective interface having the largest number of replies as the responsible interface.
16. The method of claim 1 further comprising:
initiating the counting in response to
receiving a packet from the one address and
determining that the one address is not in a list of addresses.
17. The method of claim 1 further comprising:
initiating the counting in response to expiration of a timer.
18. The method of claim 17 wherein
the timer expires after sufficient time has elapsed to receive a respective response for each request of the plurality of requests.
19. The method of claim 1 further comprising:
initiating the counting in response to a message to initiate the counting.
20. The method of claim 19 further comprising:
sending the message to initiate the counting to a second interface in response to determining that the second interface should be assigned as the responsible interface.
21. An apparatus comprising: computer-readable storage medium including: a counting module to count a respective number of replies observed by a respective interface of a plurality of interfaces in a network, wherein each reply of the replies is made in response to a respective request of a plurality of requests, and each request of the plurality of requests is for one address; an assigning module to assign a responsible interface of the plurality of interfaces to the one address using the respective number of replies observed by each respective interface; the plurality of interfaces and the one address are within a broadcast domain, and no interface of the plurality of interfaces is in-line on the network; at least one of the plurality of interfaces operates in promiscuous mode; a managing module to manage communication with the one address in response to being assigned as the responsible interface; and a sending module to send a message to each interface of the plurality of interfaces in response to being assigned as the responsible interface for the one address.

22. The apparatus of claim 21 wherein
the plurality of interfaces and the one address are within a segment of the network.
23. The apparatus of claim 21 wherein
the network is a virtual network.
24. The apparatus of claim 21 wherein
the counting is performed at a data link layer of the network.
25. The apparatus of claim 21 further comprising:
a managing module to manage communication with the one address in response to being assigned as the responsible interface.
26. The apparatus of claim 1 wherein managing the communication comprises gathering statistical information about the communication with the one address.
27. The apparatus of claim 1 wherein managing the communication comprises changing a state of the one address upon determining that no communication with the one address has occurred for a period of time.
28. The apparatus of claim 1 wherein managing the communication comprises performing mitigation during communication with the one address.
29. The apparatus of claim 28 wherein
the performing the mitigation occurs in response to determining that the one address is a threat.
30. The apparatus of claim 1 wherein managing the communication comprises redirecting communication sent by the one address in response to determining that the one address is a threat.
31. The apparatus of claim 30 wherein
the redirecting the communication occurs in response to determining that the one address is a threat.
32. The apparatus of claim 25 further comprising:
a sending module to send a message to each interface of the plurality of interfaces in response to being assigned as the responsible interface for the one address.
33. The apparatus of claim 1 further comprising: a second sending module to send a second message to a second interface in response to receiving the message from the second interface, wherein the second message indicates that the second interface is the responsible interface for the one address.
34. The apparatus of claim 1 wherein at least one respective request of the plurality of requests is sent by each respective interface of the plurality of interfaces to the one address.
35. The apparatus of claim 1 wherein the assigning the responsible interface comprises determining a largest number of replies from the respective number of replies for each respective interface, and identifying one respective interface having the largest number of replies as the responsible interface.
36. The apparatus of claim 1 further comprising: an initiating module to initiate the counting in response to receiving a packet from the one address and determining that the one address is not in a list of addresses.
37. The apparatus of claim 1 further comprising: initiating the counting in response to expiration of a timer.
38. The apparatus of claim 37 wherein
the timer expires after sufficient time has elapsed to receive a respective response for each request of the plurality of requests.
39. The apparatus of claim 1 further comprising: initiating the counting in response to a message to initiate the counting.
40. The apparatus of claim 39 further comprising:
sending the message to initiate the counting to a second interface in response to determining
that the second interface should be assigned as the responsible interface.

41. A computer-readable storage medium comprising:
counting instructions to count a respective number of replies observed by a respective interface of a plurality of interfaces in a network, wherein
each reply of the replies is made in response to a respective request of a plurality of requests, and
each request of the plurality of requests is for one address; and
assigning instructions to assign a responsible interface of the plurality of interfaces to the one address using the respective number of replies observed by each respective interface;
the plurality of interfaces and the one address are within a broadcast domain;
managing instructions to manage communication with the one address in response to being assigned as the responsible interface; and
sending instructions to send a message to each interface of the plurality of interfaces in response to being assigned as the responsible interface for the one address.

42. The computer-readable storage medium of claim 41 further comprising:
second sending instructions to send a second message to a second interface in response to receiving the message from the second interface, wherein
the second message indicates that the second interface is the responsible interface for the one address.

43. A computer system comprising:
counting means to count a respective number of replies observed by a respective interface of a plurality of interfaces in a network, wherein
each reply of the replies is made in response to a respective request of a plurality of requests, and
each request of the plurality of requests is for one address; and
assigning means to assign a responsible interface of the plurality of interfaces to the one address using the respective number of replies observed by each respective interface;
the plurality of interfaces and the one address are within a broadcast domain;
sending means to send a message to each interface of the plurality of interfaces in response to being assigned as the responsible interface for the one address; and
managing means to manage communication with the one address in response to being assigned as the responsible interface.

44. The system of claim 43 further comprising:
second sending means to send a second message to a second interface in response to receiving the message from the second interface, wherein
the second message indicates that the second interface is the responsible interface for the one address.

\* \* \* \* \*

UNITED STATES PATENT AND TRADEMARK OFFICE
CERTIFICATE OF CORRECTION

PATENT NO. : 7,596,808 B1  Page 1 of 1
APPLICATION NO. : 10/836871
DATED : September 29, 2009
INVENTOR(S) : Wilkinson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1552 days.

Signed and Sealed this

Twenty-eighth Day of September, 2010

David J. Kappos
*Director of the United States Patent and Trademark Office*